(12) United States Patent
Smith et al.

(10) Patent No.: US 7,749,321 B2
(45) Date of Patent: Jul. 6, 2010

(54) BLACK PIGMENT COMPOSITIONS, THICK FILM BLACK PIGMENT COMPOSITIONS, CONDUCTIVE SINGLE LAYER THICK FILM COMPOSITIONS, AND BLACK AND CONDUCTIVE ELECTRODES FORMED THEREFROM

(75) Inventors: Jerome D. Smith, Cary, NC (US); Pedro A. Jimenez, Guaynabo, PR (US); Tony Jackson, Garner, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/823,650

(22) Filed: Jun. 28, 2007

(65) Prior Publication Data

US 2009/0004390 A1 Jan. 1, 2009

(51) Int. Cl.
*C09C 1/62* (2006.01)
*C09C 1/00* (2006.01)
*C01G 29/00* (2006.01)
*C01G 45/02* (2006.01)
*C01G 51/04* (2006.01)

(52) U.S. Cl. ............... 106/479; 106/419; 106/432; 106/440; 106/461; 423/593.1; 423/594.1; 423/594.2; 423/594.3; 423/594.4; 423/594.5; 423/594.6; 423/594.7; 427/66; 427/126.2; 427/376.2; 427/376.3; 427/384; 501/14; 501/17; 501/32

(58) Field of Classification Search ............ 106/419, 106/432, 440, 461, 479; 423/593, 594, 599, 423/593.1, 594.1, 594.2, 594.3, 594.4, 594.5, 423/594.6, 594.7; 427/66, 126.2, 376.2, 427/376.3, 384; 501/14, 17, 32

See application file for complete search history.

(56) References Cited

U.S. PATENT DOCUMENTS

| | | | |
|---|---|---|---|
| 2,850,445 A | 9/1958 | Oster | |
| 2,875,047 A | 2/1959 | Oster | |
| 2,927,022 A | 3/1960 | Martin et el. | |
| 3,074,974 A | 1/1963 | Gebura | |
| 3,097,097 A | 7/1963 | Oster et al. | |
| 3,145,404 A | 8/1964 | Fiedler | |
| 3,380,381 A | 4/1968 | Musgrave | |
| 3,422,161 A | 1/1969 | Oakland et al. | |
| 3,479,185 A | 11/1969 | Chambers, Jr. et al. | |
| 3,549,367 A | 12/1970 | Chang et al. | |
| 4,162,162 A | 7/1979 | Dueber | |
| 4,536,535 A | 8/1985 | Usala | |
| 5,032,490 A | 7/1991 | Nebe et al. | |
| 5,851,732 A | 12/1998 | Kanda et al. | |
| 6,075,319 A | 6/2000 | Kanda et al. | |
| 2006/0051287 A1 | 3/2006 | Kaito | |
| 2006/0231806 A1 | 10/2006 | Barker et al. | |

FOREIGN PATENT DOCUMENTS

| | | | |
|---|---|---|---|
| JP | 62-70296 A | * | 3/1987 |
| JP | 09237570 | | 9/1997 |
| JP | 2007145989 | | 6/2007 |
| WO | 0037362 | | 6/2000 |
| WO | 2007063816 | | 6/2007 |

OTHER PUBLICATIONS

Chemical Abstract No. 94:184677, Ramanan et al, "Ternary Bismuth Oxides Bi26-xMxO40-y (M=Mg, Al, Co and Ni)", Materials Research Bulletin, (1981), 16(2), 169-174 [no month].*
Chemical Abstract No. 103:188328, Ramanan et al, "Low-temperature preparation of sillenite phases in Bi-Mi-O (M=Mn, Fe, Co systems)", Indian Journal of Chemistry, Section A:Inorganic, Physical, Theoretical & Analytical, (1985), 24A(7), 594-596 [no month].*
Chemical Abstract No. 121:314290, Rangavitall et al, "A Study of cubic bismuth oxides of the type Bi26-xMxO40", European Journal of Solid State and Inorganic Chemistry, (1994) 31(5), 409-422 [no month].*
Chemical Abstract No. 145:481309, Mangalam et al, "Ferroelectricity in Bi26-xMxO40", Solid State Communications, (2006) 140(1), 42-44 [no month].*
Rangavittal N. et al "A Study of Cubic Bismuth Oxides of the Type Bi26-xMx040-delta (M=Ti, Mn, Fe, Co, Ni, or Pb) related to y-Bi2O3", European Journal of Solid State and Inorganic Chemistry, Gautherier-Villars, Paris, FR, vol. 31, No. 5, Jan. 1, 1994, pp. 409-422, XP009107799.
WO 00/37362 A (DMC 2 Degussa Metals Catalysts [DE] Jun. 29, 2000 Claims.

* cited by examiner

*Primary Examiner*—Anthony J Green

(57) ABSTRACT

The present invention is directed to pigment compositions, thick film black pigment compositions, conductive single layer thick film compositions, black electrodes made from such black conductive compositions and methods of forming such electrodes, and to the uses of such compositions, electrodes, and methods in flat panel display applications, including alternating-current plasma display panel devices (AC PDP).

19 Claims, 12 Drawing Sheets

BLACK PIGMENT COMPOSITIONS, THICK FILM BLACK PIGMENT COMPOSITIONS, CONDUCTIVE SINGLE LAYER THICK FILM COMPOSITIONS, AND BLACK AND CONDUCTIVE ELECTRODES FORMED THEREFROM

FIELD OF THE INVENTION

The present invention is directed to pigment compositions, thick film black pigment compositions, conductive single layer thick film compositions, black electrodes made from such black conductive compositions and methods of forming such electrodes, more specifically the present invention is further directed to the use of such compositions, electrodes, and methods in flat panel display applications, including alternating-current plasma display panel devices (AC PDP).

BACKGROUND OF THE INVENTION

While the background of the present invention is discussed in terms of plasma display panel (PDP) applications, it is understood that the present invention is also useful in flat panel display applications, in general, as well as in black ceramic dielectrics.

The PDP typically comprises a pair of forward and backward insulation substrates arranged in opposition to each other to form a plurality of cells as display elements each defined by the insulation substrates supported with a constant interval and cell barriers arranged between the insulation substrates, two crossing electrodes disposed on internal surfaces of the insulation substrates with a dielectric layer interposed between the electrodes which cause electric discharge in a plurality of cells by application of an alternating current. Due to this application of alternating current, phosphor screens formed on the wall surface of the cell barrier emit light and display images which are passed through the transparent insulation substrate (typically called the front glass substrate or plate).

One area of concern for PDP manufacturers is display contrast, which affects the ultimate picture viewed by the consumer. To improve the display contrast, it is essential to decrease the reflection of external light from the electrodes and conductors arranged on the front glass substrate of the PDP device. This reflection decrease can be accomplished by making the electrodes and conductors black as viewed through the front plate of the display. The black pigments are used to improve cosmetics of applied circuitry by masking the circuit behind a layer of black enamel. In display applications, compositions containing black pigments are deposited in a way that enhances the contrast between the lighted pixels and the unlit areas of the display when the panel is being actively viewed.

Another area of concern for PDP manufacturers is of an environmental nature and is the lead and cadmium contained in some conventional black conductor compositions and black electrodes used in PDP devices. It is desirable to reduce and/or eliminate the lead and cadmium contained in the black conductor compositions and electrodes while still maintaining the required physical and electrical properties of the compositions and electrodes.

U.S. Pat. Nos. 5,851,732 and 6,075,319 to Kanda et al. disclose a photoformable black electrode comprising a conductive layer of at least one of $RuO_2$, ruthenium based polynary oxide or mixtures thereof formed between the substrate and conductor electrode arrangement.

Bismuth ruthenium pyrochlore and lead bismuth ruthenium pyrochlore, and other chemical compounds, have been used as black pigments.

U.S. Patent Publication No. 2006-0231806 A1, discloses the use of bismuth glasses and bismuth ruthenium pyrochlore, copper bismuth ruthenium pyrochlore, and gadolinium bismuth pyrochlore as pigments, preferably with surface areas less than 20 $m^2/g$.

Additionally, some prior art compositions have utilized "spinels" as pigment. Spinels, as used herein, are mineral oxides defined by the formula $AB_2O_4$, where A and B represent cations. While the ideal spinel formula is $MgAl_2O_4$, some 30 elements, with valences from 1 to 6, are known to substitute in the A or B cation sites, resulting in well over 150 synthetic compounds having the spinel crystal structure. Spinels have a pointed octahedral, crystal habit, and also form a dendritic snowflake form (i.e., a mineral crystallizing in another mineral in the form of a branching or treelike mark) in rapidly chilled high-temperature slags and lavas. The named spinel minerals that have so far been recorded in nature are oxides that occur as a matrix of $A^{2+}$ versus $B^{3+}$ cations.

Rangavittal N. et al., Eur. J. Solid State Inorg. Chem., v. 31, p. 409 (1994) have prepared and reported the cation distributions of several derivatives of the cubic oxide $\gamma$-$Bi_2O_3$, where the Bi atoms are replaced by any one of the following metals Co, Mn, Fe, Ti, Ni, or Pb. In particular, they showed that it was possible to prepare a wide range of compounds where a substantial portion of the bismuth could be replaced with cobalt.

The present inventors have developed novel pigment compositions that improve display contrast and avoid the above described environmental problems.

SUMMARY OF THE INVENTION

The present invention concerns a pigment composition of the formula

1. wherein the sum of x and y is between 7.8 and 20.8, and x or y is at least 1.3. In some embodiments the sum of x and y is between 13 and 20.8, where x or y is at least 2.6. In other embodiments the sum of x and y is between 15.6 and 20.8 and x or y is at least 5.

The invention further concerns s thick film black composition comprising:
 (a) black pigment of the formula

wherein the sum of x and y is between 7.8 and 20.8, and x or y is at least 1.3;
 (b) one or more glass frits with a softening point in the range of 400° C. to 600° C.;
 (c) organic polymer binder; and
 (d) organic solvent.

The invention is further directed to AC PDP devices themselves. In some embodiments, the invention is directed to single layer bus (SLB) electrodes, their use in flat panel display applications, and the use of particular novel thick film compositions in the formation of such electrodes. Alternatively, in some other embodiments, the invention is directed to multilayer bus electrodes.

DETAILED DESCRIPTION OF THE INVENTION

A. Black Pigment(s)

The current invention discloses a novel family of black pigments based on Mn/Co substitutions for Bi in $\gamma$-$Bi_2O_3$.

The pigment(s) can generally be described by the formula $$Bi_{26-x-y}Mn_xCo_yO_{40-z}$$

wherein the sum of x and y is between 7.8 and 20.8, and x or y is at least 1.3. Up to ⅓ of the total manganese and cobalt may be substituted by a variety of one or more other metals, for example Ni, Cu, Al, Ce, Pb, Ga, Mg, In, V, Li, P, Fe, Ti, Cr, Zn, Ge, Ni, Cd, Si, and other metals, especially in the +2, +3, or +4 valence state, and to a lesser degree in the +1 and +5 valence states.

Using established methods to prepare high surface area oxides, a series of mixed metal oxides have been prepared based on $\gamma$-bismuth oxide ($Bi_{26}O_{40}$), where a portion of the bismuth is replaced by one or more metal ions. These pigments are easily prepared by mixing aqueous or acid solutions containing stoichiometric amounts of the appropriate metal nitrates, and then precipitating the pigment with the addition of excess 30% sodium hydroxide solution and 3% aqueous hydrogen peroxide. The precipitate is washed with de-ionized water to remove the soluble species ($Na^+$, $NO_3^-$, and $OH^-$) and is then collected by filtration. After filtration, powder may be obtained by drying excess water from the filtrate by hot air drying, freeze drying, or spraying drying, or other applicable methods. The pigment powders prepared in this way have very high surface areas, often over 100 m2/g, and are amorphous to x-ray diffraction.

Alternatively, the pigments may be prepared by heating finely divided and well mixed constituent oxides in air at 600 C-1000 C for 16 hrs. Then subsequently regrinding the mixture and heating again to ensure complete reaction. As the amount of bismuth in the compounds decreases, it becomes increasingly difficult to assure single phase products in this kind of high temperature reaction, as a small fraction of unreacted cobalt or manganese oxide, or their spinel persists even after multiple firings.

After preparing the compounds, the powders were characterized by measuring their x-ray diffraction patterns, determining semi-quantative elemental analysis with a Rigaku ZSX Mini 11 x-ray fluorescence spectrometer and measuring their color using a Minolta CR-300 calorimeter.

Figure 5A:
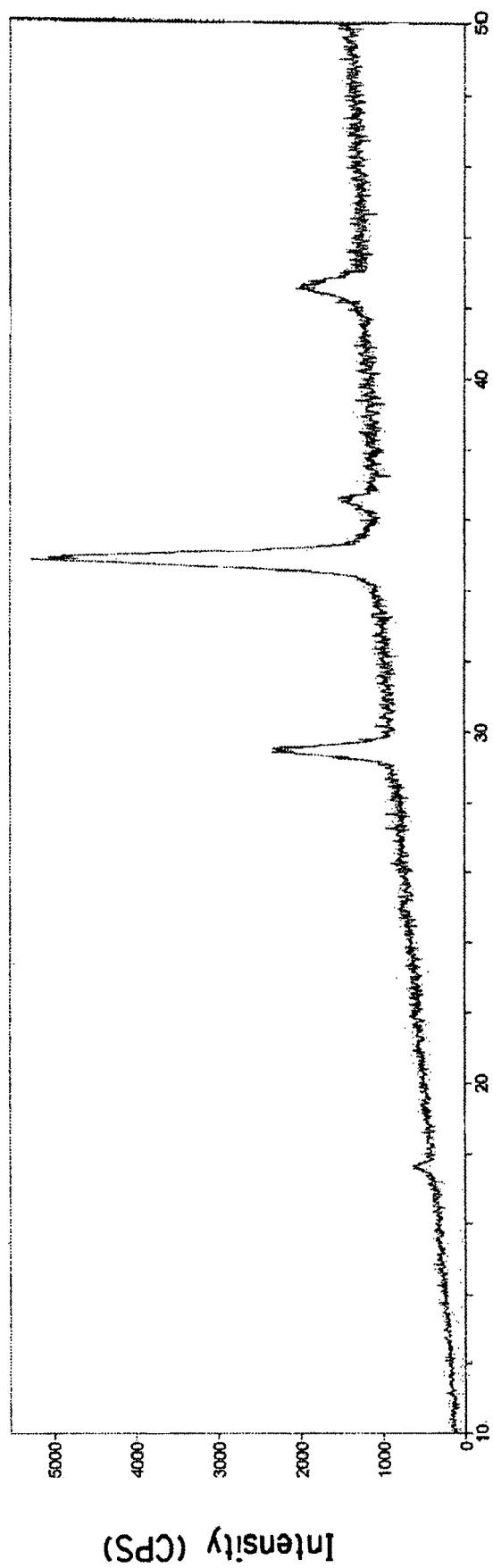
FIGS. 5A,B show the x-ray diffraction pattern of a commercial copper chromite black spinel pigment compared with lines and intensities reported for copper chromite spinel.
Figure 5B:
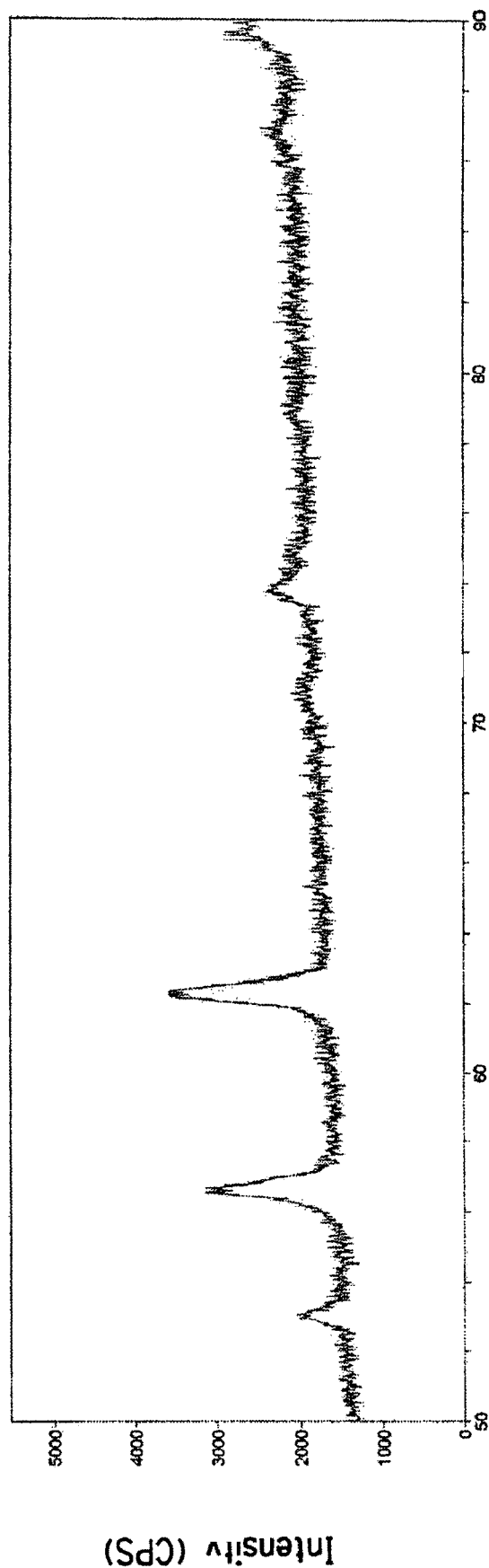
Figure 6A:
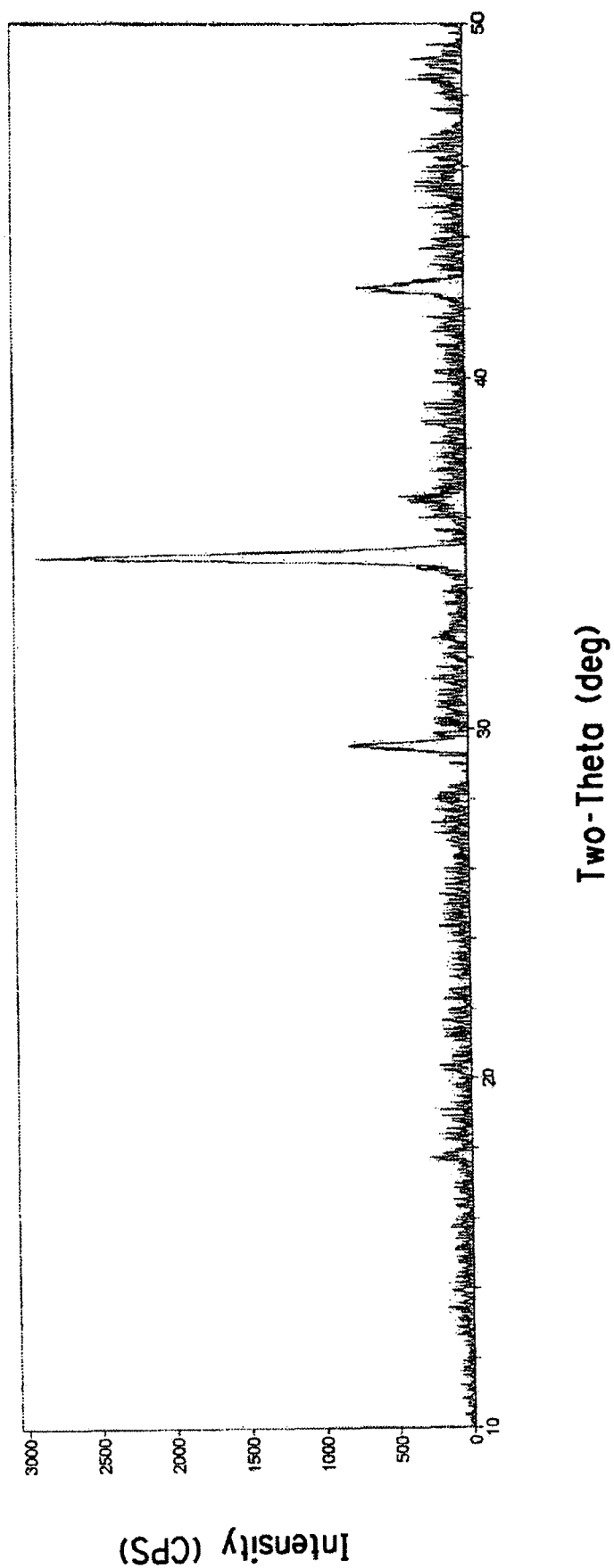
FIGS. 6 A,B show the x-ray diffraction pattern of a commercial black cobalt oxide pigment compared with lines and intensities reported for cobalt oxide in the spinel structure.
Figure 6B:
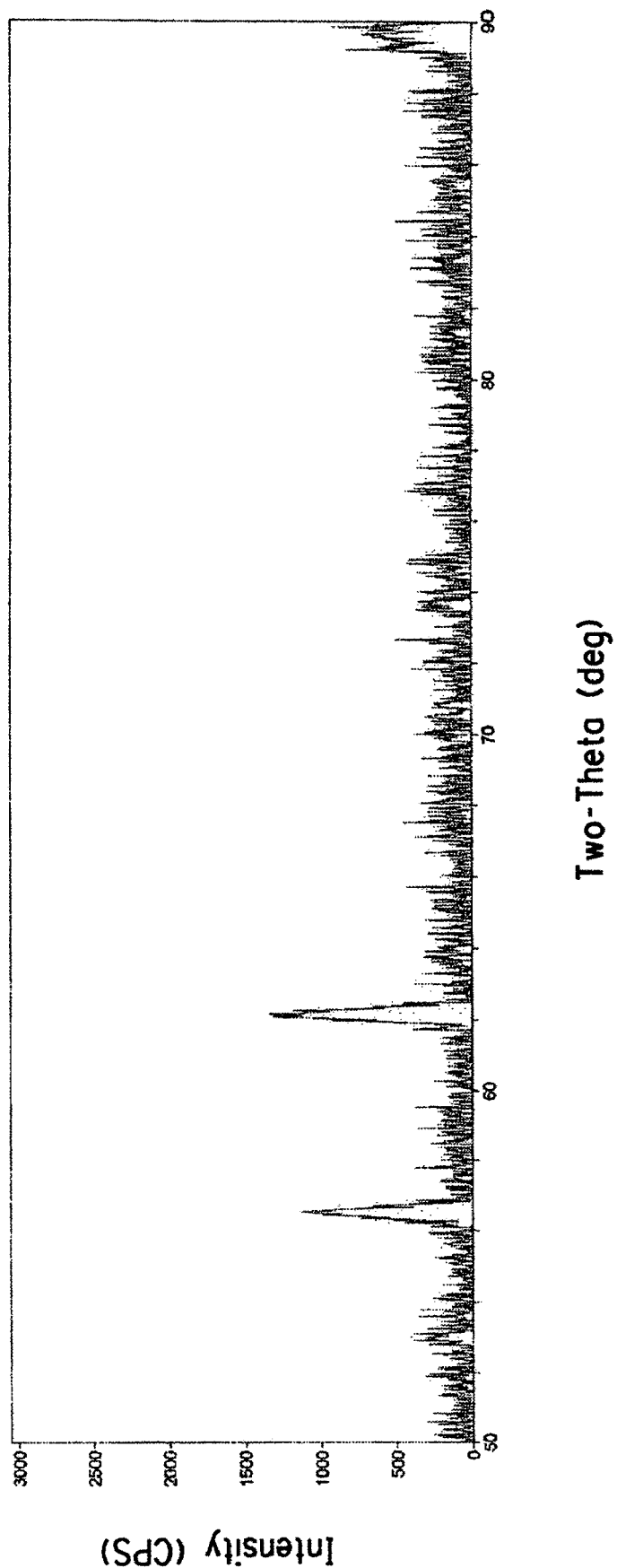
Figure 7A:
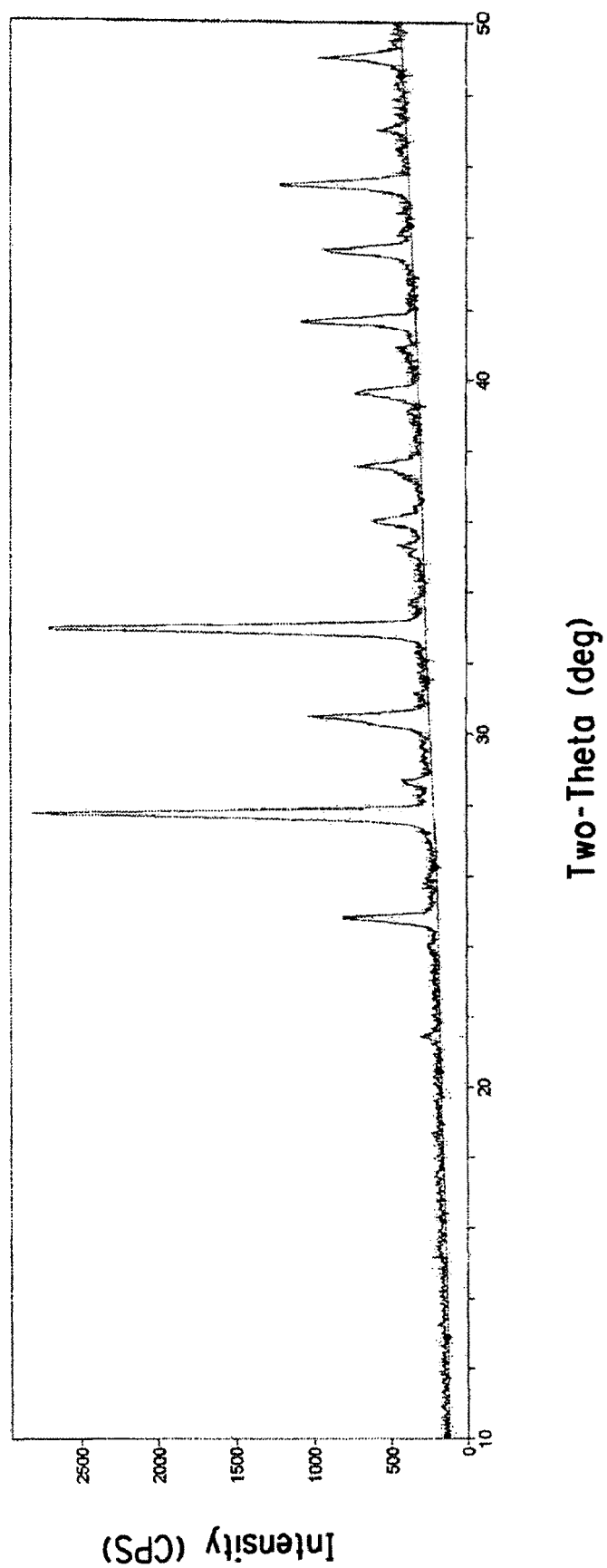
FIGS. 7 A,B show the x-ray diffraction pattern of Example 17 compared with lines and intensities reported for a bismuth cobalt oxide of similar bismuth content in the $\gamma$-$Bi_2O_3$ structure.
Figure 7B:
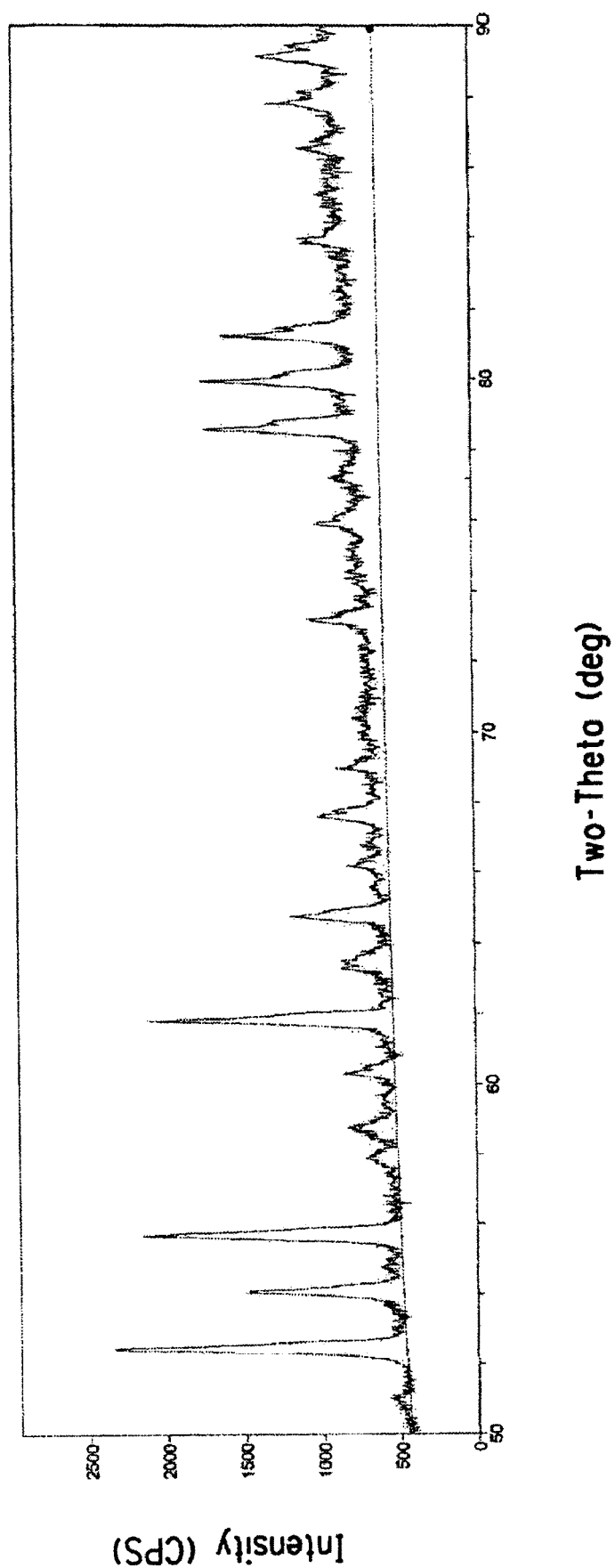
Figure 8A:
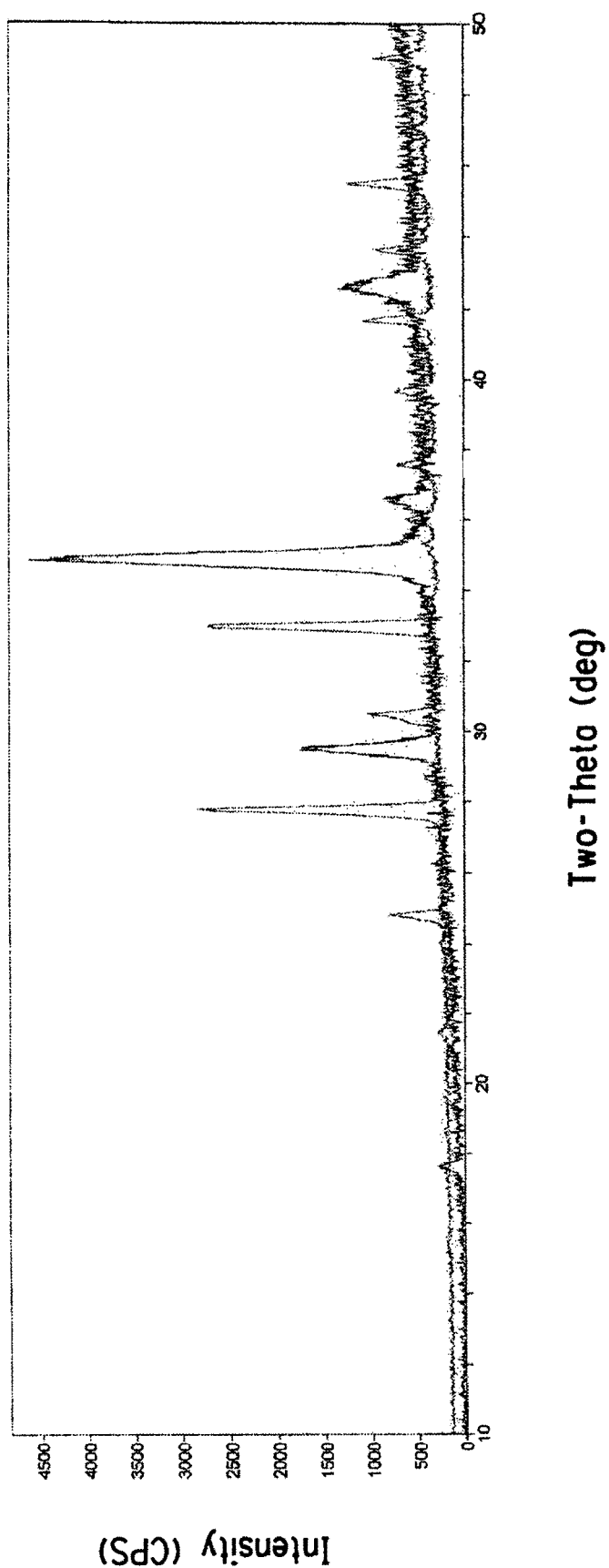
FIGS. 8 A,B show the x-ray diffraction pattern of the pigment from Example 17 contrasted to the pattern of a commercial copper chromite black spinel.
Figure 8B:
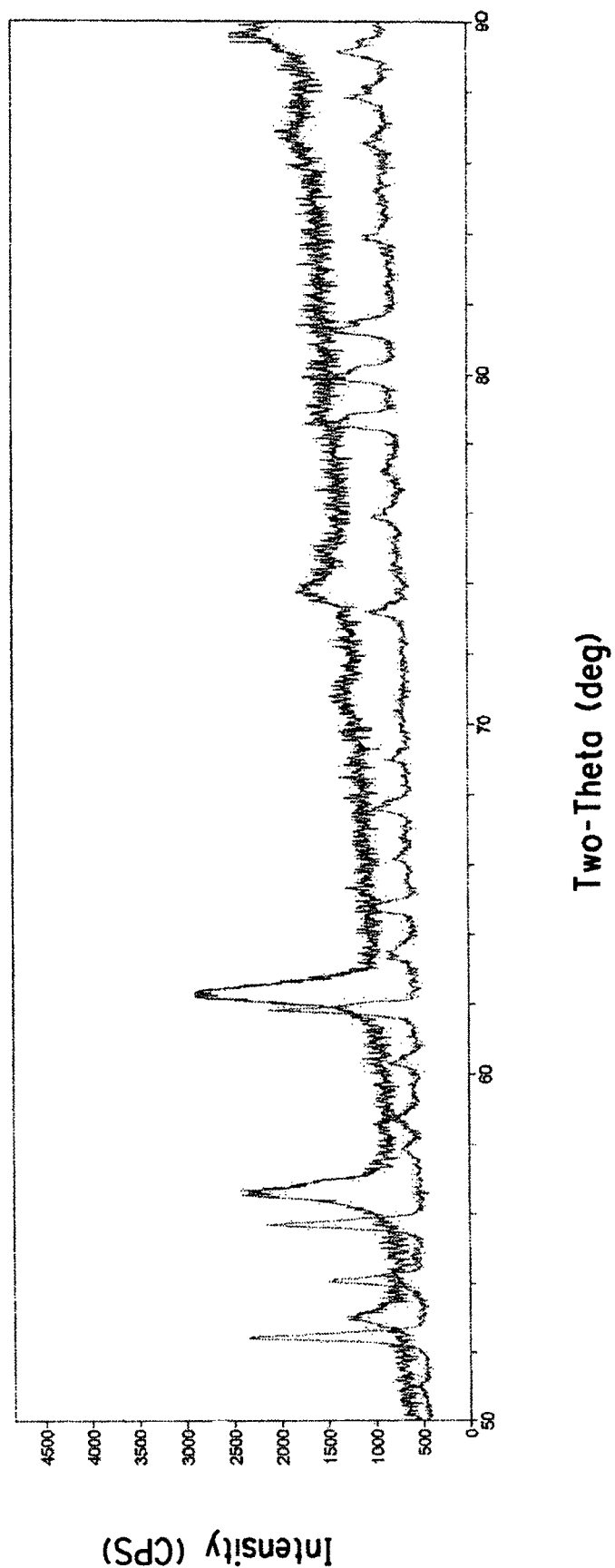

As seen in the FIGS. 5A,B through 8A,B the new pigments are not simply mixtures of previously known pigments in the spinel structure. FIGS. 5 A,B and 6 A,B show the x-ray diffraction patterns of commercially available black pigments in the spinel structure, together with the lines and intensities of the corresponding compound reported by the International Centre for Diffraction Data. In contrast, FIGS. 7A,B show the x-ray pattern of the a new pigment described in Example 17. This pattern matches well with a Bi—Co oxide of similar bismuth content in the $\gamma$-$Bi_2O_3$ structure. A visual contrast of the patterns in FIGS. 5 A,B and FIGS. 7 A,B is shown in FIGS. 8 A,B.

Many of the compounds prepared were yellow to brown in color, but surprisingly the combination of manganese and cobalt simultaneously substituted into the $\gamma$-bismuth oxide resulted in a fairly wide range of previously undisclosed black pigments with L* color below 15.

The remarkable and unexpected portion of this work is that the combination of the simultaneous substitution of cobalt and manganese in the $\gamma$-$Bi_2O_3$ structure results in very dark brown to black pigments (L*=<4 to 10), while the substitution of either Co or Mn alone in the structure result in pigments which are significantly less dark (L*>10). Useful black pigments can be prepared by including additional metal substitutions for bismuth in $\gamma$-$Bi_2O_3$, as long as a significant portion of the substitution is the Mn/Co combination.

When the pigments are formed in thick film compositions, Items B and C below, and optionally further Items D, E, and F are incorporated to form the thick film composition. As used herein, the terms "thick film" and "thick film paste" refer to dispersions of finely divided solids in an organic medium, which are of paste consistency or tape castable slurry consistency and have a rheology suitable for screen printing and spray, dip, ink jet or roll-coating. As used herein, the term "thick film" means a suspension of powders in screen printing vehicles or tape castable slurry, which upon processing forms a film with a thickness of several microns or greater. The powders typically comprise functional phases, glass and other additives for adhesion to the substrate. The vehicles typically comprise organic resins, solvents and additives for rheological reasons. The organic media for such pastes are ordinarily comprised of liquid binder polymer and various rheological agents dissolved in a solvent, all of which are completely pyrolyzable during the firing process. Such pastes can be either resistive or conductive and, in some instances, may even be dielectric in nature. The thick film compositions of the present invention contain an inorganic binder as the functional solids are required to be sintered during firing. A more detailed discussion of suitable organic media materials can be found in U.S. Pat. No. 4,536,535 to Usala, herein incorporated by reference. Depending on the application, fired thick film layers are on the order of 0.5 to 300 microns for a single print or tape layer, and all ranges contained therein. In Ag and black 2-layer electrode PDP applications the fired thickness may be in the range of 0.5 to 10 microns; for dielectric layers in PDP applications, the thickness of the fired dielectric thick film layer may be in the range of 0.5 to 20 microns.

B. Glass Frits

The glass binder (glass frit) used in the present invention promotes the sintering of pigment and/or conductive component particles. The present invention, when formed into a thick film composition, may comprise one or more glass frits with a softening point in the range of 400° C.-600° C.

In one embodiment, the glass binder used in the present invention is a lead-free, low-melting glass binder. In a further embodiment, the glass binder is a lead-free and cadmium-free Bi based amorphous glass. Other lead-free, low-melting glasses are P based or Zn—B based compositions, which may be useful in the present composition. However, P based glass does not have good water resistance, and Zn—B glass is difficult to obtain in the amorphous state, hence Bi based glasses are preferred. Bi glass can be made to have a relatively low melting point without adding an alkali metal and has little problems in making a powder. In the present invention, Bi glass having the following characteristics is most preferred.

(I) Glass composition
55-85 wt % $Bi_2O_3$
0-20 wt % $SiO_2$
0-5 wt % $Al_2O_3$
2-20 wt % $B_2O_3$
0-20 wt % ZnO
0-15 wt % one or more of oxides selected from BaO, CaO, and SrO (in the case of an oxide mixture, the maximum total is up to 15 wt %).
0-3 wt % one or more of oxides selected from $Na_2O$, $K_2O$, $Cs_2O$ and $Li_2O$ (in the case of an oxide mixture, the maximum total is up to 3 wt %).

(II) Softening point: 400-600° C.

In this specification, "softening point" means the softening point determined by differential thermal analysis (DTA).

In the present invention, the glass binder composition and softening point are important characteristics for ensuring a good balance of all the properties of a black electrode are obtained. When the softening point is below 400° C., melting of the glass may occur while organic materials are decomposed, allowing blisters to occur in the composition. Therefore it is preferred that the softening point of the glass is >400° C. On the other hand, the glass must soften sufficiently at the firing temperature employed. For example, if a firing temperature of 550° C. is used, then the softening point should be 520° C., if the softening point exceeds 520° C. electrode peeling occurs at the corners and properties such as resistance, etc., are affected, compromising the balance of the electrode properties. If a higher firing temperature is used (depending on substrate) glass with softening point up to 600° C. can be used.

The glass binders used in the present invention preferably have a $D_{50}$ (i.e., the point at which ½ of the particles are smaller than and ½ are larger than the specified size) of 0.1-10 µm as measured by a Microtrac. More preferably, the glass binders have a $D_{50}$ of 0.5 to 1 µm. Usually, in an industrially desirable process, a glass binder is prepared by the mixing and melting of raw materials such as oxides, hydroxides, carbonates, etc., making into a cullet by quenching, mechanical pulverization (wet, dry), then drying in the case of wet pulverization. Thereafter, if needed, classification is carried out to the desired size. It is desirable for the glass binder used in the present invention to have an average particle diameter smaller than the thickness of the black conductive layer to be formed.

A combination of glasses with different softening point may be used in the present invention. High softening point glasses can be combined with low softening point glasses. The proportion of each different softening point glass is determined by the precise balance of the electrode properties required. Some portion of the glass binder may be comprised a glass(es) with a softening point above 600° C.

Based on the overall composition weight, the glass binder content should be 0.5 to 20 wt %. When the glass binder content is too small, bonding to the substrate is weak. In one embodiment, the glass binder is present in the range of 2 to 10 weight percent total black composition.

(C) Organic Matter

The compositions of the present invention may also comprise organic matter. Organic matter is present in the composition in the range of 25-59 wt %, based on total composition. The organic matter included in the present invention may comprise an organic polymer binder and organic medium, including solvent. The organic matter may further comprise photoinitiators, photocurable monomers, oligomers, or unsaturated organic polymers designed to allow the formation of patterns using actinic radiation. These are explained below.

(D) Organic Polymer Binders

The polymeric binders are important in the compositions of the present invention and should be selected considering the water-based developability and high resolution. Such requirements are satisfied by the following binders. Such binders may be copolymers and interpolymers (mixed polymers) made from (1) non-acidic comonomers such as $C_{1-10}$ alkyl acrylates, $C_{1-10}$ alkyl methacrylates, styrene, substituted styrene, or combinations thereof, and (2) acidic comonomers including an ethylenically unsaturated carboxylic acid in at least 15 wt % of the total polymer weight.

The presence of the acidic comonomers in the compositions is important in the technology of the present invention. With such an acidic functional group, development in an aqueous base such as a 0.4 wt % sodium carbonate aqueous solution is possible. If the acidic comonomer content is less than 15 wt %, the composition may not be washed off completely by the aqueous base. If the acidic comonomer content is above 30%, the composition has low stability under the development conditions and the image area is only partially developed. Suitable acidic comonomers may be ethylenically unsaturated monocarboxylic acids such as acrylic acid, methacrylic acid, crotonic acid, etc.; ethylenically unsaturated dicarboxylic acids such as fumaric acid, itaconic acid, citraconic acid, vinylsuccinic acid, maleic acid, etc., their half esters (hemiesters), as well as sometimes their anhydrides and mixtures. For clean burning under a low-oxygen atmosphere, methacrylic polymers are preferred over acrylic polymers.

When the non-acidic comonomers are alkyl acrylates or alkyl methacrylates described above, the non-acidic comonomer content in the polymeric binders should be at least 50 wt %, preferably 70-75 wt %. When the non-acidic comonomers are styrene or substituted styrene, the non-acidic comonomer content in the polymeric binder should be 50 wt %, with the remaining 50 wt % being an acid anhydride such as maleic anhydride hemiester. The preferred substituted styrene is α-methylstyrene.

While not preferred, the non-acidic portion of the polymeric binder may contain less than about 50 wt % of other non-acidic comonomers substituting the alkyl acrylate, alkyl methacrylate, styrene, or substituted styrene portion of the polymer. For example, they include acrylonitrile, vinyl acetate, and acrylamide. However, in such cases, complete combustion is more difficult, thus such a monomer content should be less than about 25 wt % of the overall polymeric binder weight. Binders may consist of a single copolymer or combinations of copolymers fulfilling various standards described above. In addition to the copolymers described above, other examples include polyolefins such as polyethylene, polypropylene, polybutylene, polyisobutylene, ethylene-propylene copolymer, etc., as well as polyethers such as lower alkylene oxide polymers including polyethylene oxide.

These polymers can be prepared by solution polymerization technology commonly used in the acrylic acid ester polymerization field.

Typically, the acidic acrylic acid ester polymers described above can be obtained by mixing an α- or β-ethylenically unsaturated acid (acidic comonomer) with one or more copolymerizable vinyl monomers (non-acidic comonomer) in an organic solvent having a relatively low boiling point (75-150° C.) to obtain a 10-60% monomer mixture solution, then adding a polymerization catalyst to the monomer, followed by polymerization. The resulting mixture is heated under ambient pressure at the reflux temperature of the solvent. After completion of the polymerization reaction, the resulting acidic polymer solution is cooled to room temperature. A sample is recovered and measured for the polymer viscosity, molecular weight, and acid equivalent.

The acid-containing polymeric binder described above should have a molecular weight below 50,000.

When such compositions are coated by screen printing, the polymeric binder should have a Tg (glass transition temperature) exceeding 60° C.

(E) Photoinitiators

Suitable photoinitiators are thermally inert but generate free radicals when exposed to actinic radiation at a temperature below 185° C. These photoinitiators are compounds having two intramolecular rings inside a conjugated carbon ring system and include (un)substituted polynuclear quinines, e.g., 9,10-anthraquinone, 2-methylanthraquinone, 2-ethylanthraquinone, 2-t-butylanthraquinone, octamethylanthraquinone, 1,4-naphthoquinone, 9,10-phenanthrenequinone, benz[a]anthracene-7,12-dione, 2,3-naphthacene-5,12-dione, 2-methyl-1,4-naphthoquinone, 1,4-dimethylanthraquinone, 2,3-dimethylanthraquinone, 2-phenylanthraquinone, 2,3-diphenylanthraquinone, retenquinone[transliteration], 7,8,9,10-tetrahydronaphthacene-5,12-dione, and 1,2,3,4-tetrahydrobenz[a]anthracene-7,12-dione. Other useful photoinitiators are described in U.S. Pat. No. 2,760,863 [Of these, some are thermally active at a low temperature of 85° C., such as vicinal ketaldonyl alcohols, e.g., benzoin and pivaloin; acyloin ethers such as benzoin methyl or ethyl ether; α-methylbenzoin, α-allylbenzoin, α-phenylbenzoin, thioxanthone and its derivatives, hydrogen donors, hydrocarbon-substituted aromatic acyloin, etc.]

For initiators, photo-reducible dyes and reducing agents may be used. These are described in U.S. Pat. Nos. 2,850,445, 2,875,047, 3,097,096, 3,074,974, 3,097,097, and 3,145,104 and include phenazine, oxazine, quinones, e.g., Michler's ketone, ethyl Michler's ketone, and benzophenone, as well as hydrogen donors including leuco dyes-2,4,5-triphenylimidazolyl dimmer and their mixtures (U.S. Pat. Nos. 3,427,161, 3,479,185, and 3,549,367). The sensitizers described in U.S. Pat. No. 4,162,162 are useful with the photoinitiators and photoinhibitors. The photoinitiators and photoinitiator systems are present at 0.05-10 wt % based on the overall weight of the dry photopolymerizable layer.

(F) Photocurable Monomer

The photocurable monomer component used in the present invention has at least one polymerizable ethylene group and contains at least one addition-polymerizable ethylenically unsaturated compound.

These compounds initiate polymer formation by free radicals and undergo chain-extending addition polymerization. The monomeric compounds are not gaseous, i.e., having boiling point higher than 100° C., and have plasticizing effects on the organic polymeric binders.

Preferred monomers that can be used alone or in combination with other monomers include t-butyl(meth)acrylate, 1,5-pentanediol di(meth)acrylate, N,N-dimethylaminoethyl (meth)acrylate, ethylene glycol di(meth)acrylate, 1,4-butanediol di(meth)acrylate, diethylene glycol di(meth)acrylate, hexamethylene glycol di(meth)acrylate, 1,3-propanediol di(meth)acrylate, decamethylene glycol di(meth)acrylate, 1,4-cyclohexanediol di(meth)acrylate, 2,2-dimethylolpropane di(meth)acrylate, glycerol di(meth)acrylate, tripropylene glycol di(meth)acrylate, glycerol tri(meth)acrylate, trimethylolpropane tri(meth)acrylate, compounds described in U.S. Pat. No. 3,380,381, 2,2-di(p-hydroxyphenyl)propane di(meth)acrylate, pentaerythritol tetra(meth)acrylate, triethylene glycol diacrylate, polyoxyethylene-1,2-di(p-hydroxyethyl)propane dimethacrylate, bisphenol A di[3-(meth)acryloyloxy-2-hydroxypropyl]ether, bisphenol A di[2-(meth)acryloyloxyethyl]ether, 1,4-butanediol di(3-methacryloyloxy-2-hydroxypropyl)ether, triethylene glycol dimethacrylate, polyoxyporpyltrimethylolpropane triacrylate, butylenes glycol di(meth)acrylate, 1,2,4-butanediol [sic] tri(meth)acrylate, 2,2,4-trimethyl-1,3-pentanediol di(meth)acrylate, 1-phenylethylene 1,2-dimethacrylate, diallyl fumarate, styrene, 1,4-benzenediol dimethacrylate, 1,4-diisopropenylbenzene, and 1,3,5-triisopropenylbenzene [(meth)acrylate means both acrylate and methacrylate].

Useful are ethylenically unsaturated compounds having molecular weights below 300, e.g., an alkylene or polyalkylene glycol diacrylate prepared from an alkylene glycol or polyalkylene glycol, such as a 1-10 ether bond-containing $C_{2-15}$ alkylene glycol, and those described in U.S. Pat. No. 2,927,022, such as those containing a terminal addition-polymerizable ethylene bond.

Other useful monomers are disclosed in U.S. Pat. No. 5,032,490, herein incorporated by reference.

Preferred monomers are polyoxyethylenated trimethylolpropane tri(meth)acrylate, ethylated pentaerythritol acrylate, trimethylolpropane tri(meth)acrylate, dipentaerythritol monohydroxypentacrylate, and 1,10-decanediol dimethacrylate.

Other preferred monomers are monohydroxypolycaprolactone monoacrylate, polyethylene glycol diacrylate (molecular weight: about 200), and polyethylene glycol dimethacrylate (molecular weight: about 400). The unsaturated monomer component content is 1-20 wt % based on the overall weight of the dry photopolymerizable layer.

(G) Organic Medium

The organic medium is mainly used for the easy coating of dispersions containing a finely pulverized composition on ceramics and other substrates. Thus, first, the organic medium should be capable of dispersing the solid components in a stable manner and, second, the rheological property of the organic medium is to impart good coatability to the dispersion.

In the organic medium, the solvent component that may be a solvent mixture should be selected from those capable of complete dissolution of polymers and other organic components. The solvents are selected from those that are inert (not reactive) with respect to the paste composition components. Solvents are selected from those that have a sufficiently high volatility, thus evaporate well from the dispersion even when coated under ambient pressure at a relatively low temperature, while in the case of the printing process, the volatility should not be too high, causing rapid drying of the paste on the screen at room temperature. Solvents that can be favorably used in the paste compositions should have boiling point below 300° C. under ambient pressure, preferably below 250° C. Such solvents may be aliphatic alcohols or their esters such as acetic acid esters or propionic acid esters; terpenes such as pine resin, α- or β-terpineol, or mixtures thereof; ethylene glycol, ethylene glycol monobutyl ether, and ethylene glycol esters such as butyl Cellosolve acetate; butyl Carbitol and Carbitol esters such as butyl Carbitol acetate and Carbitol acetate; Texanol (2,2,4-trimethyl-1,3-pentanediol monoisobutyrate), and other suitable solvents.

The compositions of the present invention may also contain additional components described below, in addition to the components described above.

(H) Additional Components

These are dispersants, stabilizers, plasticizers, releases, stripping agents, defoamers, wetting agents, etc., that are well known in the art. Common materials are disclosed in U.S. Pat. No. 5,032,490 herein incorporated by reference.

(I). Optional Conductive Metal Particles

Optional conductive metal particles are utilized in the formation of electrode layer compositions. The optional conductive metal particles may be selected from the group comprising gold, silver, platinum, palladium, copper, ruthenium dioxide, polanary oxides of ruthenium and mixtures thereof; may also be utilized in the invention.

Application of Pigments in Non-Photoimageable Thick Film Composition

Using these new pigments, thick film electronic compositions have been made using a standard ethyl cellulose medium and commercially available bismuth-containing oxide glasses. When these compositions are applied in a layer on a substrate and fired between 400 and 600 C, the resulting films are generally black in color, with L* between 4 and 10.

Modeling of L* Color Index in Composition Space

Figure 1:
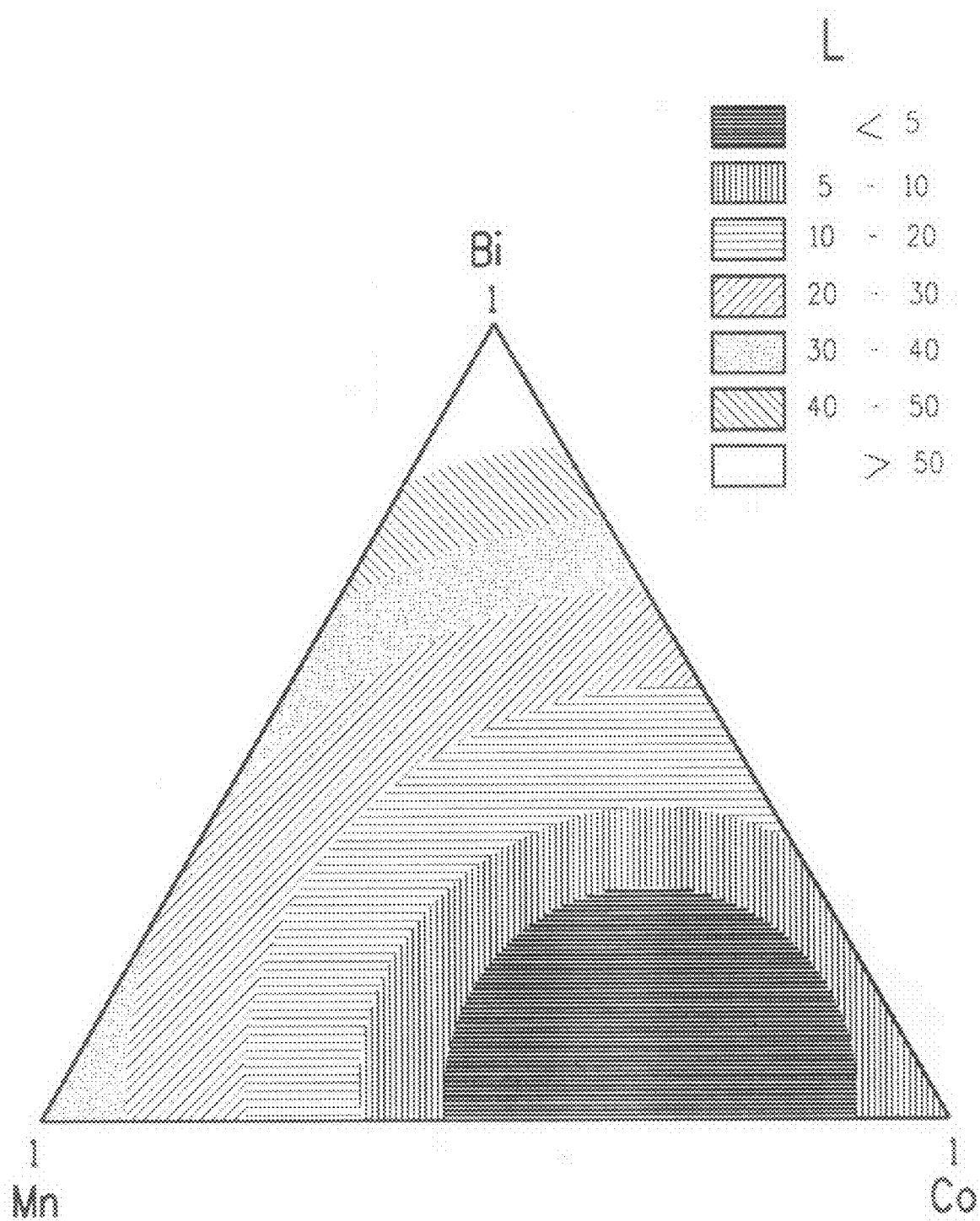
FIG. 1 details a trilinear contour plot the fitted quadratic model of L* color index in the bismuth oxide, manganese dioxide, and ferric oxide system.

Pigment colors were explored in the bismuth oxide, ferric oxide, manganese dioxide system using a designed experiment. The mixture experiment included patent examples 1, 2, 5, 7, as well as bismuth oxide, manganese dioxide, and ferric oxide. L* color indices were fit to a quadratic mixture model using Minitab-14. The L* model, fit with a quadratic mixture model to an $R^2$ of 99% is shown plotted as a contour plot in FIG. 1. The tri-linear axis, are shown as mole % metal in the oxides. For example, $Bi_{13}Mn_{13}O_{40}$ is can be plotted on the diagram as Bi, 0.5; Mn, 0.5; Fe, 0.0. The colors are largely represented by linear combinations of the L* indices component oxides (bismuth oxide, manganese dioxide, and ferric oxide). The color is darkest in the vicinity of manganese dioxide, less dark near ferric oxide and gradually approaches pale yellow near bismuth oxide.

Figure 2:
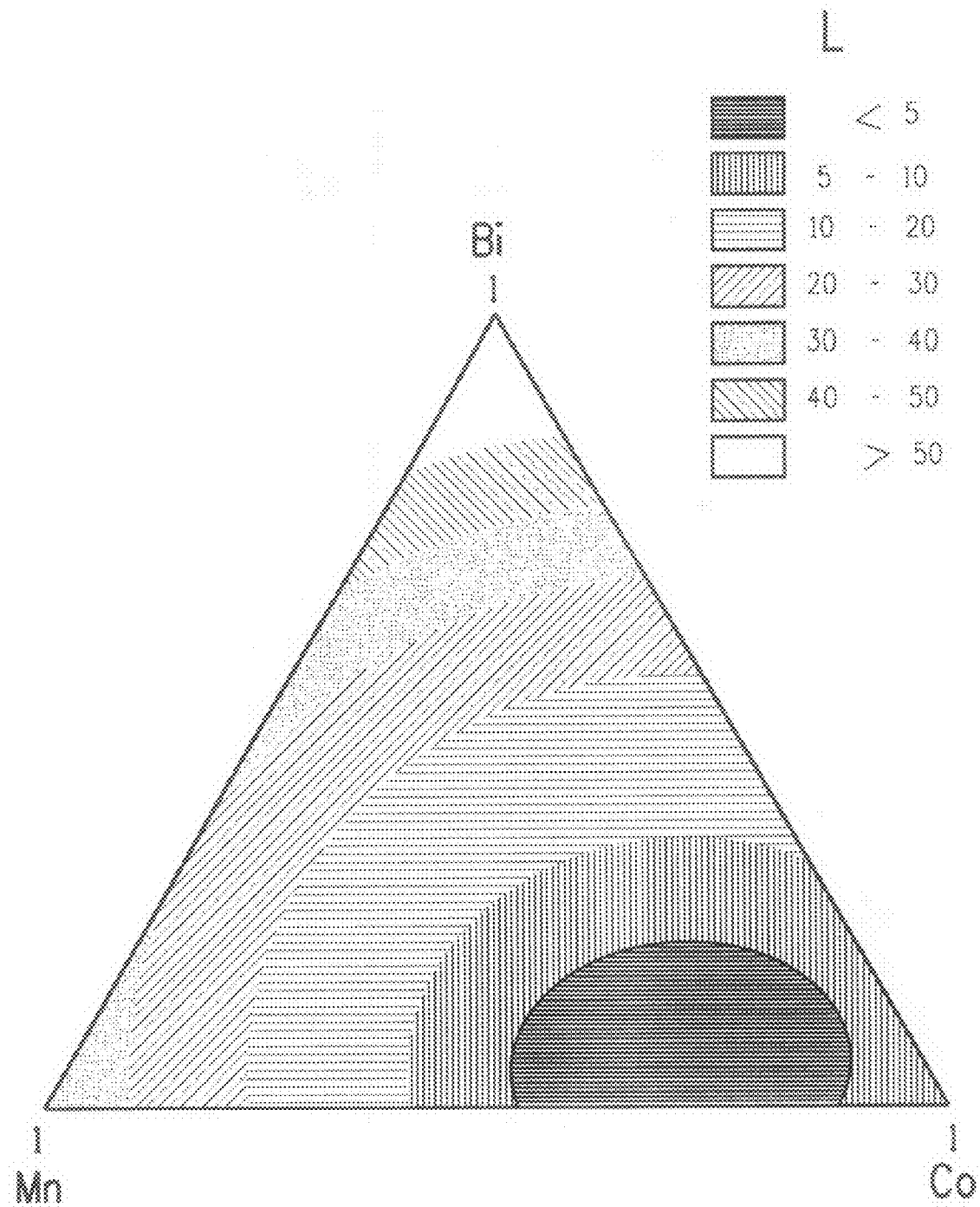
FIG. 2 details a trilinear contour plot the fitted quadratic model of L* color index in the bismuth oxide, cobalt oxide, and ferric oxide system FIG. 3 details a trilinear contour plot the fitted quadratic model of L* color index in the bismuth oxide, manganese dioxide, and cobalt oxide system.

FIG. 2 shows the corresponding tri-linear contour plots in the bismuth oxide, cobalt oxide, ferric oxide system. In this case the quadratic model for L* (fit with an $R^2$ of 99% to patent examples 2,3,4, and 6, as well as the corners represented by bismuth oxide, ferric oxide, and cobalt oxide) is quite similar to that shown in FIG. 1. Again the L* color is lowest (darkest) near cobalt oxide, and gradually becomes larger (lighter) as the pigment composition moves toward ferric oxide and/or bismuth oxide.

Figure 3:
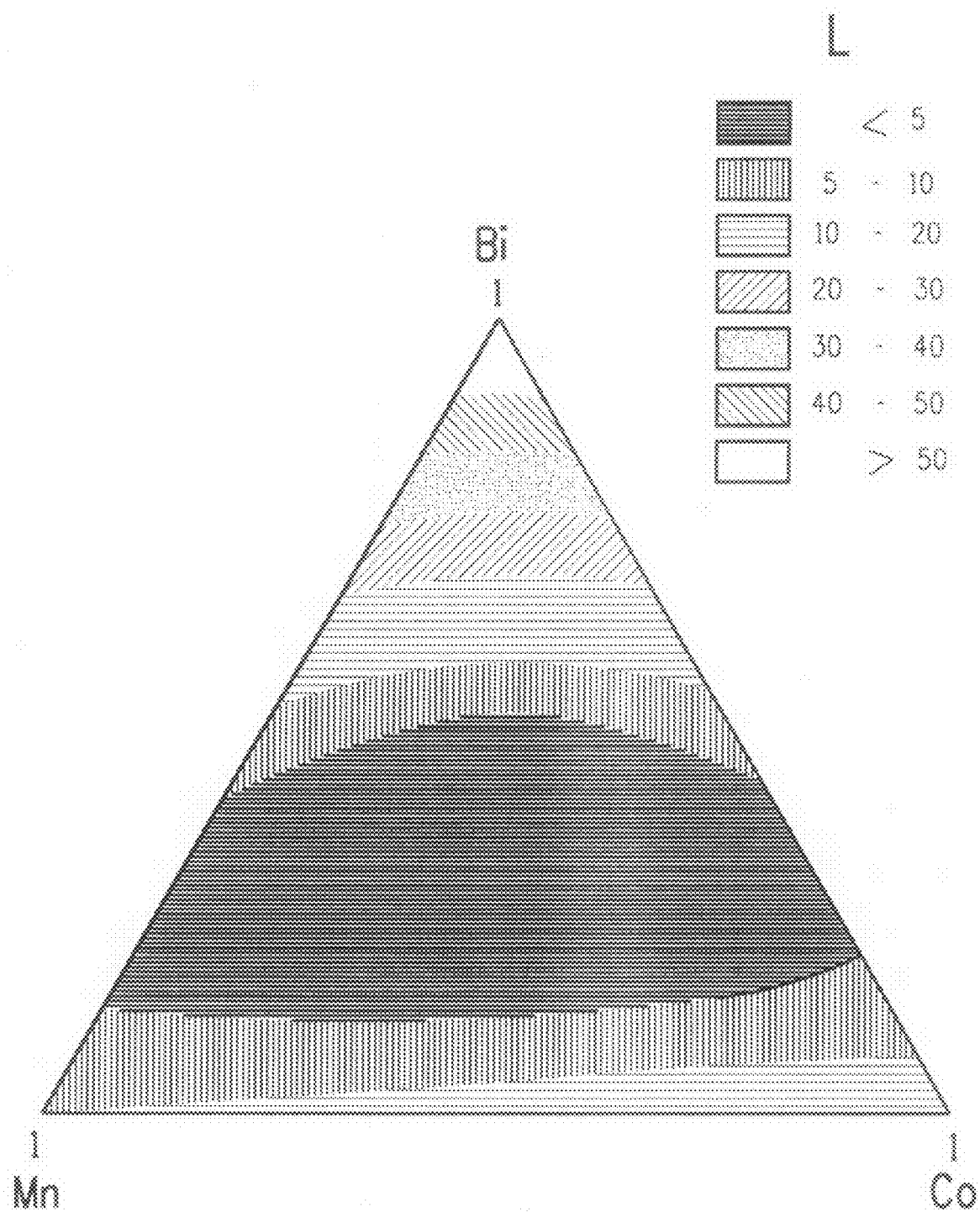
Figure 4:
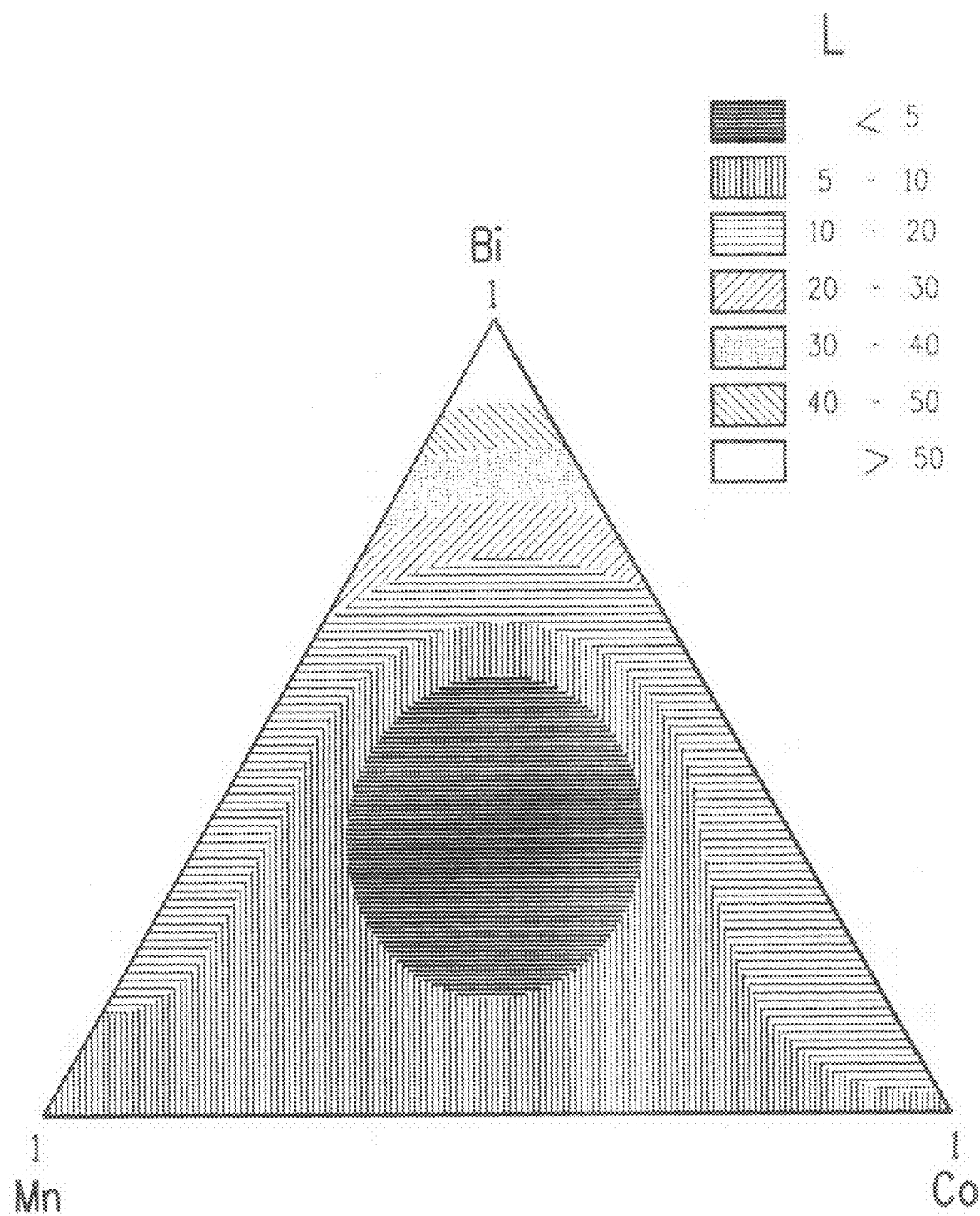
FIG. 4 details a trilinear contour plot the fitted cubic model of L* color index in the bismuth oxide, manganese dioxide, and cobalt oxide system.

In the case of the bismuth oxide, cobalt oxide, manganese dioxide system however we see a different and unexpected pattern. The quadratic mixture model fit ($R^2$=86%) to the L* indices of patent examples 1, 3, 4, 8, 9, 12 thru 33, as well as the corner points represented by bismuth oxide, cobalt oxide, and manganese dioxide is shown in FIG. 3. A large compositional area exits between 10 and 70 mol % bismuth where the combination of manganese, cobalt, and bismuth oxides combine to form dark pigments L*<20, where the darkness is largely independent of the manganese/cobalt ratio. The fit can be improved by including the full set of cubic terms in the mixture model. Shown in FIG. 4, this model ($R^2$=99%), the areas of lowest L* values in the center of the diagram are bounded by areas of higher L* when the manganese or cobalt content is reduced to below about 5 mol %. The area of lowest L* indices is in the center of the diagram roughly centered at 33 mol % cobalt and 33 mol % manganese (34 mole % bismuth).

EXAMPLES

X-ray diffraction scans of the oxide powders that were formed in the precipitations have been run, but they have invariably been amorphous powders. Consistent with this finding are SEM micrographs that show the inherent particle size of the powders to be about 30 nm in diameter. The surface area of these powders is very high, usually in excess of 100 $m^2/g$. To confirm that these materials are in fact based on substituted $\gamma$-$Bi_2O_3$, a few examples were prepared using standard high temperature approaches. The x-ray diffraction pattern of Example 17, closely matches the pattern of $Bi_{10}Co_{16}O_{40}$ measured by Rangvitall, et al. and it's L* a* b* color indices closely match those of the precipitated compound of the same composition (Example 16). Similarly, the x-ray diffraction pattern of Example 25 matches well the pattern of $Bi_{10}Co_{16}O_{40}$ reported by Rangvitall. In the literature report, a small amount (5%) of unreacted $CO_3O_4$ was persistent, and in our high temperature synthesis, a similarly small amount of manganese-cobalt spinel was observed. The L* indices are not quite as low for the high temperature material, but are still similar enough that we believe the substituted $\gamma$-$Bi_2O_3$ is an appropriate assignment for the precipitated powder.

In a separate attempt to produce more crystalline powders from the precipitation reactions, a precipitated solid of composition $Bi_{13}Mn_{6.5}Co_{6.5}O_{40}$ was prepared and was then left in the basic sodium nitrate solution, stirred and heated at 80 C for 5 days. The Ostwald-ripened powder was then filtered, washed, and air dried. The x-ray diffraction pattern of this powder was more crystalline, showing a series of broad diffraction peaks that corresponded well to the $Bi_{10}Co_{16}O_{40}$ pattern found by Rangivittal, et al. The L* color of this more crystalline powder matches closely the L* color of the amorphous powder made by directly filtering, washing, and drying the precipitate.

Because of the lack of definitive x-ray diffraction patterns, it is difficult to establish the lowest bismuth content where only substituted $\gamma$-$Bi_2O_3$ forms in the Bi—Co—Mn oxide precipitates. But the mixture of what are believed to be Co—Mn spinels and the substituted $\gamma$-$Bi_2O_3$ phases are nonetheless effective black pigments.

After precipitation, the surface area of the pigment powders is typically >100 m2/g. As is known in the art, such high surface area powders can be difficult to adequately disperse in organic medium. The powders may be calcined above 300° C. to sinter the particles and reduce the surface area. A typical profile for calcining pigment powders is 520 C for 3 hours, which reduces the original surface area to about 20 m2/g.

A summary of the example pigment compositions and colors prepared during this work is shown in Table 1. Table 2 lists a comparison of the theoretical metal content of the powders (total metal=100%) and the compositions as determined using the semiquantitative analytic method of x-ray fluorescence spectroscopy.

TABLE 1

Powder Compositions and Color Indices

| | nominal composition | CIELAB 1976 L* a* b* Color Indices | | |
|---|---|---|---|---|
| | | L* | a* | b* |
| Example 1 | $Bi_{13}Mn_{13}O_{40}$ | 18.25 | 2.08 | 0.69 |
| Example 2 | $Bi_{13}Fe_{13}O_{40}$ | 33.08 | 11.84 | 12.84 |
| Example 3 | $Bi_{13}Co_{13}O_{40}$ | 16.05 | 1.43 | 0.31 |
| Example 4 | $Bi_{10}Co_{16}O_{40}$ | 24.93 | 2.11 | 1.14 |
| Example 5 | $Bi_{13}Mn_{6.5}Fe_{6.5}O_{40}$ | 21.58 | 2.95 | 1.35 |
| Example 6 | $Bi_8Co_9Fe_9O_{40}$ | 8.15 | 1.54 | 0.00 |
| Example 7 | $Bi_8Mn_9Fe_9O_{40}$ | 10.37 | 1.62 | 0.29 |
| Example 8 | $Bi_{5.2}Co_{20.8}O_{40}$ | 11.02 | 1.37 | −0.02 |
| Example 9 | $Bi_{5.2}Mn_{20.8}O_{40}$ | 10.12 | 1.39 | −0.10 |
| Example 10 | $Bi_{11}Co_{7.5}Cu_{7.5}O_{40}$ | 25.12 | 1.92 | 1.12 |
| Example 11 | $Bi_{11}Mn_{7.5}Cu_{7.5}O_{40}$ | 20.40 | 2.29 | 0.80 |
| Example 12 | $Bi_{20.8}Mn_{2.6}Co_{2.6}O_{40}$ | 30.64 | 1.59 | 1.73 |
| Example 13 | $Bi_{18.2}Mn_{5.2}Co_{2.6}O_{40}$ | 14.80 | 1.45 | 0.31 |
| Example 14 | $Bi_{18.2}Mn_{2.6}Co_{5.2}O_{40}$ | 13.00 | 1.40 | 0.09 |
| Example 15 | $Bi_{18.2}Mn_{3.9}Co_{3.9}O_{40}$ | 15.57 | 1.51 | 0.34 |
| Example 16 | $Bi_{15.6}Mn_{5.2}Co_{5.2}O_{40}$ | 5.44 | 0.56 | −0.40 |
| Example 17 | $Bi_{15.6}Mn_{5.2}Co_{5.2}O_{40}$ | 6.77 | 0.08 | −0.93 |
| Example 18 | $Bi_{13}Mn_{6.5}Co_{6.5}O_{40}$ | 4.52 | 0.48 | −0.42 |
| Example 19 | $Bi_{13}Mn_{6.5}Co_{6.5}O_{40}$ | 4.00 | 0.44 | −0.42 |
| Example 20 | $Bi_{13}Mn_{6.5}Co_{6.5}O_{40}$ | 3.81 | 0.42 | −0.41 |
| Example 21 | $Bi_{13}Mn_{9.75}Co_{3.25}O_{40}$ | 7.65 | 1.05 | −0.29 |
| Example 22 | $Bi_{13}Mn_{3.25}Co_{9.75}O_{40}$ | 7.12 | 0.91 | −0.32 |
| Example 23 | $Bi_{13}Mn_{6.5}Co_{6.5}O_{40}$ | 4.53 | 0.49 | −0.41 |
| Example 24 | $Bi_{8.67}Mn_{8.67}Co_{8.67}O_{40}$ | 4.44 | 0.47 | −0.45 |
| Example 25 | $Bi_{8.67}Mn_{8.67}Co_{8.67}O_{40}$ | 11.27 | 0.39 | −0.91 |
| Example 26 | $Bi_{6.5}Mn_{13}Co_{6.5}O_{40}$ | 4.39 | 0.53 | −0.38 |
| Example 27 | $Bi_{6.5}Mn_{6.5}Co_{13}O_{40}$ | 4.67 | 0.54 | −0.39 |
| Example 28 | $Bi_{5.2}Mn_{10.4}Co_{10.4}O_{40}$ | 4.38 | 0.57 | −0.42 |
| Example 29 | $Bi_{5.2}Mn_{18.2}Co_{2.6}O_{40}$ | 4.54 | 0.59 | −0.37 |
| Example 30 | $Bi_{5.2}Mn_{2.6}Co_{18.2}O_{40}$ | 6.68 | 0.97 | 0.37 |
| Example 31 | $Bi_{5.2}Mn_{19.5}Co_{1.3}O_{40}$ | 5.94 | 0.90 | −0.33 |
| Example 32 | $Bi_{5.2}Mn_{1.3}Co_{19.5}O_{40}$ | 7.97 | 1.05 | −0.26 |
| Example 33 | $Bi_{2.6}Mn_{11.7}Co_{11.7}O_{40}$ | 4.42 | 0.52 | −0.40 |
| Example 34 | $Bi_{11}Mn_5Co_5Al_5O_{40}$ | 5.13 | 0.33 | −0.41 |
| Example 35 | $Bi_{11}Mn_5Co_5Ce_5O_{40}$ | 11.30 | 1.37 | −0.04 |
| Example 36 | $Bi_{11}Mn_5Co_5Cu_5O_{40}$ | 4.54 | 0.39 | −0.27 |
| Example 37 | $Bi_{11}Mn_5Co_5Ni_5O_{40}$ | 4.49 | 0.48 | −0.48 |
| Example 38 | $Bi_{11}Mn_5Co_5Fe_5O_{40}$ | 4.97 | 0.43 | −0.35 |
| Example 39 | $Bi_{11}Mn_5Co_5Nd_5O_{40}$ | 5.10 | 0.18 | −0.41 |

TABLE 2

X-ray Fluorescence Semi-quantitative Analysis of Examples Calculated and Actual Metal Content (100% Metal basis)

| | nominal composition | Bi calc | Bi act | Co calc | Co act | Mn calc | Mn act | Other Metal | calc | act |
|---|---|---|---|---|---|---|---|---|---|---|
| Example 1 | $Bi_{13}Mn_{13}O_{40}$ | 79.2 | 81.4 | | | 20.8 | 18.6 | | | |
| Example 2 | $Bi_{13}Fe_{13}O_{40}$ | 78.9 | 81.6 | | | | | Fe | 21.1 | 18.4 |
| Example 3 | $Bi_{13}Co_{13}O_{40}$ | 78.0 | 79.8 | 22.0 | 20.2 | | | | | |
| Example 4 | $Bi_{10}Co_{16}O_{40}$ | 68.9 | 72.8 | 31.1 | 27.2 | | | | | |
| Example 5 | $Bi_{13}Mn_{6.5}Fe_{6.5}O_{40}$ | 79.1 | 81.3 | | | 10.4 | 9.6 | Fe | 10.6 | 9.1 |
| Example 6 | $Bi_8Co_9Fe_9O_{40}$ | 61.8 | 59.6 | 19.6 | 21.1 | | | Fe | 18.6 | 19.2 |
| Example 7 | $Bi_8Mn_9Fe_9O_{40}$ | 62.6 | 63.5 | | | 18.8 | 15.9 | Fe | 18.5 | 20.6 |
| Example 8 | $Bi_{5.2}Co_{20.8}O_{40}$ | 47.0 | 50.0 | 53.0 | 50.0 | | | | | |
| Example 9 | $Bi_{5.2}Mn_{20.8}O_{40}$ | 48.7 | 50.8 | | | 51.3 | 49.1 | | | |
| Example 10 | $Bi_{11}Co_{7.5}Cu_{7.5}O_{40}$ | 71.5 | 73.5 | 13.7 | 13.1 | | | Cu | 14.8 | 13.4 |
| Example 11 | $Bi_{11}Mn_{7.5}Cu_{7.5}O_{40}$ | 72.1 | 73.6 | | | 12.9 | 12.8 | Cu | 15.0 | 13.6 |
| Example 12 | $Bi_{20.8}Mn_{2.6}Co_{2.6}O_{40}$ | 93.6 | 94.8 | 3.3 | 2.7 | 3.1 | 2.5 | | | |
| Example 13 | $Bi_{18.2}Mn_{5.2}Co_{2.6}O_{40}$ | 89.7 | 90.7 | 3.6 | 3.2 | 6.7 | 6.1 | | | |
| Example 14 | $Bi_{18.2}Mn_{2.6}Co_{5.2}O_{40}$ | 89.4 | 90.2 | 7.2 | 6.3 | 3.4 | 3.5 | | | |
| Example 15 | $Bi_{18.2}Mn_{3.9}Co_{3.9}O_{40}$ | 89.5 | 90.3 | 5.4 | 4.9 | 5.0 | 4.8 | | | |
| Example 16 | $Bi_{15.6}Mn_{5.2}Co_{5.2}O_{40}$ | 84.6 | 85.8 | 8.0 | 7.3 | 7.4 | 6.9 | | | |
| Example 17 | $Bi_{15.6}Mn_{5.2}Co_{5.2}O_{40}$ | 84.6 | 79.2 | 8.0 | 10.2 | 7.4 | 10.6 | | | |
| Example 18 | $Bi_{13}Mn_{6.5}Co_{6.5}O_{40}$ | 78.6 | | 11.1 | | 10.3 | | | | |
| Example 19 | $Bi_{13}Mn_{6.5}Co_{6.5}O_{40}$ | 78.6 | | 11.1 | | 10.3 | | | | |
| Example 20 | $Bi_{13}Mn_{6.5}Co_{6.5}O_{40}$ | 78.6 | | 11.1 | | 10.3 | | | | |
| Example 21 | $Bi_{13}Mn_{9.75}Co_{3.25}O_{40}$ | 78.9 | 80.1 | 5.6 | 5.3 | 15.6 | 14.6 | | | |
| Example 22 | $Bi_{13}Mn_{3.25}Co_{9.75}O_{40}$ | 78.3 | 79.5 | 16.6 | 15.4 | 5.2 | 5.0 | | | |
| Example 23 | $Bi_{13}Mn_{6.5}Co_{6.5}O_{40}$ | 78.6 | 79.7 | 11.1 | 10.2 | 10.3 | 10.0 | | | |
| Example 24 | $Bi_{8.67}Mn_{8.67}Co_{8.67}O_{40}$ | 64.7 | 66.7 | 18.3 | 16.5 | 17.0 | 16.7 | | | |
| Example 25 | $Bi_{8.67}Mn_{8.67}Co_{8.67}O_{40}$ | 64.7 | 64.9 | 18.3 | 16.9 | 17.0 | 18.1 | | | |
| Example 26 | $Bi_{6.5}Mn_{13}Co_{6.5}O_{40}$ | 55.3 | 56.0 | 15.6 | 15.0 | 29.1 | 29.0 | | | |
| Example 27 | $Bi_{6.5}Mn_{6.5}Co_{13}O_{40}$ | 54.7 | 56.8 | 30.9 | 29.3 | 14.4 | 13.9 | | | |
| Example 28 | $Bi_{5.2}Mn_{10.4}Co_{10.4}O_{40}$ | 47.9 | 52.8 | 27.0 | 25.7 | 25.2 | 21.8 | | | |
| Example 29 | $Bi_{5.2}Mn_{18.2}Co_{2.6}O_{40}$ | 47.2 | 49.9 | 6.2 | 6.6 | 46.6 | 43.4 | | | |
| Example 30 | $Bi_{5.2}Mn_{2.6}Co_{18.2}O_{40}$ | 48.5 | 49.4 | 6.8 | 6.6 | 44.6 | 44.0 | | | |
| Example 31 | $Bi_{5.2}Mn_{19.5}Co_{1.3}O_{40}$ | 48.6 | 52.5 | 3.4 | 3.1 | 47.9 | 44.4 | | | |
| Example 32 | $Bi_{5.2}Mn_{1.3}Co_{19.5}O_{40}$ | 47.1 | 49.0 | 49.8 | 47.6 | 3.1 | 3.4 | | | |
| Example 33 | $Bi_{2.6}Mn_{11.7}Co_{11.7}O_{40}$ | 29.0 | 33.8 | 36.8 | 34.8 | 34.3 | 31.4 | | | |
| Example 34 | $Bi_{11}Mn_5Co_5Al_5O_{40}$ | 76.6 | 79.9 | 9.8 | 9.1 | 9.2 | 9.7 | Al | 4.5 | 1.2 |
| Example 35 | $Bi_{11}Mn_5Co_5Ce_5O_{40}$ | 64.4 | 68.4 | 8.3 | 7.5 | 7.7 | 7.6 | Ce | 19.6 | 16.6 |
| Example 36 | $Bi_{11}Mn_5Co_5Cu_5O_{40}$ | 72.2 | 74.2 | 9.3 | 7.9 | 8.6 | 9.6 | Cu | 10.0 | 8.2 |
| Example 37 | $Bi_{11}Mn_5Co_5Ni_5O_{40}$ | 72.7 | 75.5 | 9.3 | 7.7 | 8.7 | 8.5 | Ni | 9.3 | 8.3 |
| Example 38 | $Bi_{11}Mn_5Co_5Fe_5O_{40}$ | 73.0 | 76.9 | 9.4 | 5.9 | 8.7 | 9.1 | Fe | 8.9 | 8.1 |
| Example 39 | $Bi_{11}Mn_5Co_5Nd_5O_{40}$ | 64.0 | 66.4 | 8.2 | 7.0 | 7.7 | 7.3 | Nd | 20.1 | 19.3 |

It is evident from the literature that the γ-bismuth oxide structure is amenable to substitution by a wide range of metal ions. So it would not be surprising that similar metal ions could be substituted into the Co/Mn-containing bismuth oxide pigments described here.

Several compounds described in Examples 34 through 39 were prepared where about ⅓ of the Co—Mn content was replaced with other metals known to substitute in the γ-bismuth oxide structure. Each of these examples produced a relatively dark pigment with L* indices ranging from 4 to 11. These examples can be contrasted with Examples 5, 10, and 11, where at an approximately comparable Bi level, the pigments are much less dark in the absence of the combination of Mn and Co.

To demonstrate the utility of the new black pigments a series of compositions were prepared incorporating the black pigment into an electronic composition with bismuth borosilicate glasses, dispersed in an ethyl cellulose-based medium. The preparation of these compositions, are described in Examples 40 thru 43. After completely dispersing the pigments and frits into the organic vehicle, test parts were prepared and fired as described. After firing, L* a* b* color indices on each individual part was measured through the glass slide on the glass/pigmented composition interface. A summary of the results is listed in Table 3. At 400 C, all parts are noticeably gray because of the lack of frit sintering and wetting of the pigment. As the firing temperature increases, most compositions, notably Example 41 and 42 become darker in color as shown by the lower L* indices. Example 40 with the highest Bi content reaches it's darkest color at 450 C, and then gradually lightens, perhaps because of decomposition or solubility of the pigment into the Bi glasses. Example 43, which has the lowest Bi content in the pigment appears to inhibit sintering at low firing temperatures but is nearly as dark as the Examples 42 and 43 at 600 C.

TABLE 3

Example 40-43 Color indices vs firing temperature

|  | Example 40 | Example 41 | Example 42 | Example 43 |
|---|---|---|---|---|
| 400 C. | | | | |
| L* | 27.1 | 30.7 | 24.4 | 25.1 |
| a* | 0.42 | 0.55 | 0.72 | 0.99 |
| b* | −0.23 | 0.01 | −0.1 | 0.14 |
| 450 C. | | | | |
| L* | 5.1 | 5.6 | 6.4 | 15.3 |
| a* | 0.33 | 0.38 | 0.45 | 0.70 |
| b* | −0.6 | −0.61 | −0.58 | −0.27 |
| 500 C. | | | | |
| L* | 5.3 | 5.4 | 5.1 | 10.9 |
| a* | 0.35 | 0.46 | 0.33 | 0.60 |
| b* | −0.68 | −0.67 | −0.68 | −0.46 |
| 550 C. | | | | |
| L* | 7.7 | 4.8 | 4.9 | 6.1 |
| a* | 1.15 | 0.51 | 0.32 | 0.32 |
| b* | −0.49 | −0.50 | −0.51 | −0.60 |
| 600 C. | | | | |
| L* | 21.4 | 5.3 | 4.4 | 5.3 |
| a* | 3.04 | 0.64 | 0.37 | 0.25 |
| b* | 0.84 | −0.51 | −0.46 | −0.54 |

Example 45 shows the use of a new black pigment composition in a photosensitive black paste designed to be used in conjunction with a paste containing silver powder as described by Kanda, et al. The paste was prepared by dispersing the inorganic frit and pigment into an organic vehicle described by Kanda. The composition was then screen printed onto a glass slide and dried. Subsequently a layer of photoimageable silver conducts was printed over the black layer and dried. Then the two layers were exposed at 400-800 mJ using a UV exposure units and developed in 1% sodium carbonate solution at 85 F for about 15 sec. The resulting patterned conductor was subsequently fired forming a conductive network with sintered Ag over an opaque black layer, useful in display manufacture, per Kanda, et al.

Examples 46 shows, that the precipitated and dried pigment powder can be calcined to reduce its surface area.

Examples 47 shows that the blackness of the resultant fired film is dependent on the surface area of the calcined pigment powder, especially when the fired film is thin. Darker color is observed with surface areas below 20 $m^2/g$.

Example 1

In a 2 liter Erlenmeyer flask, 37.9 grams of bismuth nitrate pentahydrate and 8.98 grams of manganese carbonate were dissolved in 55 ml of 70% nitric acid and 200 ml of de-ionized water. Next, 120 ml of 30% sodium hydroxide solution and 177 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 2

In a 2 liter Erlenmeyer flask, 37.8 grams of bismuth nitrate pentahydrate and 31.47 grams of ferric nitrate nonahydrate were dissolved in 50 ml of 70% nitric acid and 200 ml of de-ionized water. Next, 120 ml of 30% sodium hydroxide solution and 74 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 3

In a 2 liter Erlenmeyer flask, 37.44 grams of bismuth nitrate pentahydrate and 22.46 grams of cobalt (ii) nitrate hexahydrate were dissolved in 50 ml of 70% nitric acid and 200 ml of de-ionized water. Next, 120 ml of 30% sodium hydroxide solution and 175 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 4

In a 2 liter Erlenmeyer flask 19.28 grams of bismuth nitrate pentahydrate, and 18.51 grams of cobalt (ii) nitrate hexahydrate were dissolved in 25 ml of 70% nitric acid and 100 ml of de-ionized water. Next, 57 ml of 30% sodium hydroxide solution and 144 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 5

In a 2 liter Erlenmeyer flask, 37.9 grams of bismuth nitrate pentahydrate, 15.76 grams of ferric nitrate nonahydrate and 4.49 grams of manganese carbonate were dissolved in 53 ml of 70% nitric acid and 200 ml of de-ionized water. Next, 120 ml of 30% sodium hydroxide solution and 88 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 6

In a 2 liter Erlenmeyer flask, 23.20 grams of bismuth nitrate pentahydrate, 21.73 grams of ferric nitrate nonahydrate and 15.66 grams of cobalt (ii) nitrate hexahydrate were dissolved in 40 ml of 70% nitric acid and 200 ml of de-ionized water. Next, 120 ml of 30% sodium hydroxide solution and 91 ml of 3% aqueous hydrogen peroxide were simultaneously added to the solution as it was being actively stirred. The mixture was stirred for about 1 hr. Then the resulting dark brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 7

In a 2 liter Erlenmeyer flask, 23.46 grams of bismuth nitrate pentahydrate, 21.97 grams of ferric nitrate nonahydrate and 18.91 grams of 51% manganous nitrate solution were dissolved in 40 ml of 70% nitric acid and 200 ml of de-ionized water. Next, 123 ml of 30% sodium hydroxide solution and 91 ml of 3% aqueous hydrogen peroxide were simultaneously added to the solution as it was being actively stirred. The mixture was stirred for about 1 hr. Then the resulting dark brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 8

In a 1 liter Erlenmeyer flask, 10.68 grams of bismuth nitrate pentahydrate and 25.63 grams of cobalt (ii) nitrate hexahydrate were dissolved in 25 ml of 70% nitric acid and 100 ml of de-ionized water. Next, 57 ml of 30% sodium hydroxide solution and 200 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 9

In a 1 liter Erlenmeyer flask, 10.99 grams of bismuth nitrate pentahydrate and 33.43 grams of 51% manganous nitrate solution were dissolved in 25 ml of 70% nitric acid and 100 ml of de-ionized water. Next, 57 ml of 30% sodium hydroxide solution and 200 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 10

In a 1 liter Erlenmeyer flask, 27.67 grams of bismuth nitrate pentahydrate, and 11.32 grams of cobalt (ii) nitrate hexahydrate, and 9.04 grams of copper (ii) nitrate hydrate were dissolved in 40 ml of 70% nitric acid and 100 ml of de-ionized water. Next, 91 ml of 30% sodium hydroxide solution and 88 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 11

In a 1 liter Erlenmeyer flask, 27.88 grams of bismuth nitrate pentahydrate, and 13.63 grams of 51% manganous nitrate solution, and 9.12 grams of copper (ii) nitrate hydrate were dissolved in 40 ml of 70% nitric acid and 100 ml of de-ionized water. Next 114 ml of 30% sodium hydroxide solution and 86 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 12

In a 2 liter Erlenmeyer flask, 51.12 grams of bismuth nitrate pentahydrate 4.58 grams of 51% manganous nitrate solution and 3.83 grams of cobalt (ii) nitrate hexahydrate were dissolved in 50 ml of 70% nitric acid and 200 ml of de-ionized water. Next, 114 ml of 30% sodium hydroxide solution and 60 ml of 3% aqueous hydrogen peroxide were simultaneously added to the solution as it was being actively stirred. The mixture was stirred for about 1 hr. Then the resulting brown precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 13

In a 1 liter Erlenmeyer flask, 36.16 grams of bismuth nitrate pentahydrate 7.41 grams of 51% manganous nitrate solution, and 3.10 grams of cobalt (ii) nitrate hexahydrate were dissolved in 40 ml of 70% nitric acid and 100 ml of de-ionized water. Next, 91 ml of 30% sodium hydroxide solution and 72 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 14

In a 1 liter Erlenmeyer flask, 36.09 grams of bismuth nitrate pentahydrate 3.70 grams of 51% manganous nitrate solution, and 6.19 grams of cobalt (ii) nitrate hexahydrate were dissolved in 40 ml of 70% nitric acid and 100 ml of de-ionized water. Next, 91 ml of 30% sodium hydroxide solution and 72 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 15

In a 1 liter Erlenmeyer flask, 36.13 grams of bismuth nitrate pentahydrate 5.55 grams of 51% manganous nitrate solution, and 4.64 grams of cobalt (ii) nitrate hexahydrate were dissolved in 40 ml of 70% nitric acid and 100 ml of de-ionized water. Next, 91 ml of 30% sodium hydroxide solution and 72 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 16

In a 2 liter Erlenmeyer flask, 42.66 grams of bismuth nitrate pentahydrate 10.19 grams of 51% manganous nitrate solution and 8.53 grams of cobalt (ii) nitrate hexahydrate were dissolved in 50 ml of 70% nitric acid and 200 ml of de-ionized water. Next, 114 ml of 30% sodium hydroxide solution and 133 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 17

47.17 grams of bismuth (iii) oxide, 5.42 grams of cobalt oxide ($CO_3O_4$) and 7.76 grams of manganese carbonate were ground together with a mortar and pestle. The resulting mixture was placed in an alumina crucible and fired at 775 C for 20 hours twice, regrinding the powders between firings.

Example 18

In a 2 liter Erlenmeyer flask, 37.67 grams of bismuth nitrate pentahydrate, 4.46 grams of manganese carbonate and 11.30 grams of cobalt (ii) nitrate hexahydrate were dissolved in 52 ml of 70% nitric acid and 200 ml of de-ionized water. Next, 120 ml of 30% sodium hydroxide solution and 176 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 19

In a 500 ml volumetric flask, 75.34 grams of bismuth nitrate pentahydrate 27.00 grams of 51% manganous nitrate solution and 22.60 grams of cobalt (ii) nitrate hexahydrate were dissolved in 100 ml of 70% nitric acid and 200 ml of de-ionized water. Then the solution was brought to a total of 500 ml with de-ionized water. In a separate 500 ml volumetric flask, 352 ml of 3% aqueous hydrogen peroxide was diluted to 500 ml with de-ionized water. Using a peristolic pump, the two solutions were mixed together using a Y-shaped connector and discharged over a period of about 10 minutes into a stainless steel beaker containing 280 ml of 30% sodium hydroxide solution that was being vigorously stirred. After the solution has been fully discharged into the beaker, it was stirred for a further 1 hour. The resulting black precipitate was filtered through a 15 cm diameter Whatman GF/B filter disk mounted in a Buchner funnel. The precipitate was washed with 10 aliquots of 100 ml of de-ionized water, then removed to a stainless steel tray and frozen. The frozen precipitate was then freeze dried using a commercial freeze dryer.

Example 20

In a 2 liter Erlenmeyer flask, 37.67 grams of bismuth nitrate pentahydrate 14.78 grams of 51% manganous nitrate solution and 11.30 grams of cobalt (ii) nitrate hexahydrate were dissolved in 50 ml of 70% nitric acid and 200 ml of de-ionized water. Next, 140 ml of 30% sodium hydroxide solution and 176 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a stainless steel tray and frozen. The frozen precipitate was then freeze dried using a commercial freeze dryer.

Example 21

In a 2 liter Erlenmeyer flask, 37.79 grams of bismuth nitrate pentahydrate 6.72 grams of manganese carbonate and 5.67 grams of cobalt (ii) nitrate hexahydrate were dissolved in 54 ml of 70% nitric acid and 200 ml of de-ionized water. Next, 123 ml of 30% sodium hydroxide solution and 177 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 22

In a 2 liter Erlenmeyer flask, 37.55 grams of bismuth nitrate pentahydrate 2.22 grams of manganese carbonate and 16.90 grams of cobalt (ii) nitrate hexahydrate were dissolved in 51 ml of 70% nitric acid and 200 ml of de-ionized water. Next, 120 ml of 30% sodium hydroxide solution and 175 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 23

In a 2 liter Erlenmeyer flask, 37.67 grams of bismuth nitrate pentahydrate 14.78 grams of 51% manganous nitrate solution and 11.30 grams of cobalt (ii) nitrate hexahydrate were dissolved in 50 ml of 70% nitric acid and 200 ml of de-ionized water. Next, 140 ml of 30% sodium hydroxide solution and 176 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 24

In a 2 liter Erlenmeyer flask, 27.89 grams of bismuth nitrate pentahydrate 19.99 grams of 51% manganous nitrate solution and 16.73 grams of cobalt (ii) nitrate hexahydrate were dissolved in 50 ml of 70% nitric acid and 200 ml of de-ionized water. Next, 261 ml of 30% sodium hydroxide solution and 114 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 25

54.12 grams of bismuth (iii) oxide, 18.93 grams of cobalt oxide ($CO_3O_4$) and 26.70 grams of manganese carbonate were ground together with a mortar and pestle. The resulting mixture was placed in an alumina crucible and fired at 750 C for 20 hours twice, regrinding the powders between firings.

Example 26

In a 2 liter Erlenmeyer flask, 24.76 grams of bismuth nitrate pentahydrate 35.50 grams of 51% manganous nitrate solution and 14.85 grams of cobalt (ii) nitrate hexahydrate were dissolved in 50 ml of 70% nitric acid and 200 ml of de-ionized water. Next, 114 ml of 30% sodium hydroxide solution and 347 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 27

In a 2 liter Erlenmeyer flask, 24.56 grams of bismuth nitrate pentahydrate 17.60 grams of 51% manganous nitrate solution and 29.47 grams of cobalt (ii) nitrate hexahydrate were dissolved in 50 ml of 70% nitric acid and 200 ml of de-ionized water. Next, 114 ml of 30% sodium hydroxide solution and 344 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example. 28

In a 1 liter Erlenmeyer flask, 17.33 grams of bismuth nitrate pentahydrate, 24.85 grams of 51% manganous nitrate solution, and 20.80 grams of cobalt (ii) nitrate hexahydrate were dissolved in 40 ml of 70% nitric acid and 100 ml of de-ionized water. Next, 91 ml of 30% sodium hydroxide solution and 327 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example. 29

In a 1 liter Erlenmeyer flask, 17.52 grams of bismuth nitrate pentahydrate 43.95 grams of 51% manganous nitrate solution, and 5.26 grams of cobalt (ii) nitrate hexahydrate were dissolved in 40 ml of 70% nitric acid and 100 ml of de-ionized water. Next, 91 ml of 30% sodium hydroxide solution and 327 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example. 30

In a 1 liter Erlenmeyer flask, 17.15 grams of bismuth nitrate pentahydrate 6.15 grams of 51% manganous nitrate solution, and 36.01 grams of cobalt (ii) nitrate hexahydrate were dissolved in 40 ml of 70% nitric acid and 100 ml of de-ionized water. Next, 91 ml of 30% sodium hydroxide solution and 327 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 31

In a 1 liter Erlenmeyer flask, 10.97 grams of bismuth nitrate pentahydrate 29.48 grams of 51% manganous nitrate solution, and 1.65 grams of cobalt (ii) nitrate hexahydrate were dissolved in 25 ml of 70% nitric acid and 100 ml of de-ionized water. Next, 57 ml of 30% sodium hydroxide solution and 200 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 32

In a 1 liter Erlenmeyer flask, 10.70 grams of bismuth nitrate pentahydrate 1.92 grams of 51% manganous nitrate solution, and 24.07 grams of cobalt (ii) nitrate hexahydrate were dissolved in 25 ml of 70% nitric acid and 100 ml of de-ionized water. Next, 57 ml of 30% sodium hydroxide solution and 200 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 33

In a 2 liter Erlenmeyer flask, 15.6 grams of bismuth nitrate pentahydrate 50.32 grams of 51% manganous nitrate solution and 42.12 grams of cobalt (ii) nitrate hexahydrate were dissolved in 50 ml of 70% nitric acid and 200 ml of de-ionized water. Next, 114 ml of 30% sodium hydroxide solution and 656 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 34

In a 1 liter Erlenmeyer flask, 29.29 grams of bismuth nitrate pentahydrate 9.54 grams of 51% manganous nitrate solution, 10.3 grams of aluminum nitrate nonahydrate, and 7.99 grams of cobalt (ii) nitrate hexahydrate were dissolved in 40 ml of 70% nitric acid and 100 ml of de-ionized water. Next, 91 ml of 30% sodium hydroxide solution and 124 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 35

In a 1 liter Erlenmeyer flask, 25.36 grams of bismuth nitrate pentahydrate 8.26 grams of 51% manganous nitrate solution, 10.32 grams of cerium (iii) nitrate hexahydrate and 6.91 grams of cobalt (ii) nitrate hexahydrate were dissolved in 40 ml of 70% nitric acid and 100 ml of de-ionized water. Next, 91 ml of 30% sodium hydroxide solution and 108 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 36

In a 1 liter Erlenmeyer flask, 20.22 grams of bismuth nitrate pentahydrate 6.59 grams of 51% manganous nitrate solution, 4.41 grams of cupric nitrate 2.5 hydrate, and 5.52 grams of cobalt (ii) nitrate hexahydrate were dissolved in 25 ml of 70% nitric acid and 100 ml of de-ionized water. Next, 60 ml of 30% sodium hydroxide solution and 86 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 37

In a 1 liter Erlenmeyer flask, 28.07 grams of bismuth nitrate pentahydrate 9.15 grams of 51% manganous nitrate solution, 7.65 grams of nickel (ii), and 5.52 grams of cobalt (ii) nitrate hexahydrate were dissolved in 40 ml of 70% nitric acid and 100 ml of de-ionized water. Next, 91 ml of 30% sodium hydroxide solution and 119 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 38

In a 1 liter Erlenmeyer flask, 28.18 grams of bismuth nitrate pentahydrate 9.18 grams of 51% manganous nitrate solution, 10.66 grams of ferric nitrate nonahydrate, and 7.66 grams of cobalt (ii) nitrate hexahydrate were dissolved in 40 ml of 70% nitric acid and 100 ml of de-ionized water. Next, 91 ml of 30% sodium hydroxide solution and 91 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 39

In a 1 liter Erlenmeyer flask, 25.23 grams of bismuth nitrate pentahydrate, 8.22 grams of 51% manganous nitrate solution, 8.53 grams of neodymium acetate hydrate and 6.88 grams of cobalt (ii) nitrate hexahydrate were dissolved in 40 ml of 70% nitric acid and 100 ml of de-ionized water. Next, 91 ml of 30% sodium hydroxide solution and 107 ml of 3% aqueous hydrogen peroxide were simultaneously added to the solution as it was being actively stirred. The mixture was stirred for about 1 hr. Then the resulting black precipitate was filtered through a 15 cm diameter Whatman GF/B filter disk mounted in a Buchner funnel. The precipitate was washed with 10 aliquots of 100 ml of de-ionized water, then removed to a Pyrex® glass dish and dried at 90 C for 8 hrs.

Example 40

16 grams of an ethyl cellulose medium, 0.8 grams of soya lethicin, 5.6 grams of (R3838), 8.4 grams of (R3899) and 5.20 grams of the black pigment from Example 16 were mixed, and then dispersed on a 3-roll mill. A 20 um wet film of the composition was doctor bladed onto a series of glass slides. The wet film was dried for 10 minutes in a 150 C oven. Then individual glass slides were fired for 15 minutes at one of the following temperatures: 400, 450, 500, 550, and 600 C.

Example 41

16 grams of an ethyl cellulose medium, 0.8 grams of soya lethicin, 5.6 grams of (R3838), 8.4 grams of (R3899) and 5.20 grams of the black pigment from Example 8 were mixed, and then dispersed on a 3-roll mill. A 20 um wet film of the composition was doctor bladed onto a series of glass slides. The wet film was dried for 10 minutes in a 150 C oven. Then individual glass slides were fired for 15 minutes at one of the following temperatures: 400, 450, 500, 550, and 600 C.

Example 42

16 grams of an ethyl cellulose medium, 0.8 grams of soya lethicin, 5.6 grams of (R3838), 8.4 grams of (R3899) and 5.20 grams of the black pigment from Example 11 were mixed, and then dispersed on a 3-roll mill. A 20 um wet film of the composition was doctor bladed onto a series of glass slides. The wet film was dried for 10 minutes in a 150 C oven. Then individual glass slides were fired for 15 minutes at one of the following temperatures: 400, 450, 500, 550, and 600 C.

Example 43

16 grams of an ethyl cellulose medium, 0.8 grams of soya lethicin, 5.6 grams of (R3838), 8.4 grams of (R3899) and 5.20 grams of the black pigment from Example 14 were mixed, and then dispersed on a 3-roll mill. A 20 um wet film of the composition was doctor bladed onto a series of glass slides. The wet film was dried for 10 minutes in a 150 C oven. Then individual glass slides were fired for 15 minutes at one of the following temperatures: 400, 450, 500, 550, and 600 C.

Example 44

A photoimageable composition of the kind described by Kanda was prepared by mixing 33% of a vehicle (34.8% of a Copolymer of 75% methylmethacrylate and 25% methacrylic acid, Mw.about.=7000, Tg=120.degree. C., Acid No.=164; 46.6% 2,2,4 Trimethylpentanediol-1,3 monoisobutyrate; 1.5% PVP/VA S-630, ISP Corp; 8.8% Diethyl thioxanthone; 8.2% Ethyl 4-(dimethylamino)benzoate; 0.06% 1,4,4-Trimethyl-2,3-diazabicyclo[3.2.2]-non-2-ene-N,N'-dioxide), 8.0% Trimethylolpropane ethoxy triacrylate monomer, 1% malonic acid, 0.2% butylated hydroxytoluene, 6.8% 2,2,4 Trimethylpentanediol-1,3 monoisobutyrate, 27% Glass Powder BT328—Nihon Yamamura Glass, 8% Glass powder BT2602-5—Nihon Yamamura Glass, and 16% of the pigment from Example 24. The composition was dispersed using a 3-roll mill. The composition was susbsequented screen printed to a dried thickness of 4 um on glass slides, and dried in a box oven for 15 minutes at 100 C. Additionally, some of the parts were overprinted using DuPont DC204 Fodel® Ag Conductor with a dried thickness of about 10 um and dried in a box oven for 15 minutes at 100 C. The parts, either single layer or two layer structure, were then exposed through a phototool with a collimated UV exposure source. The exposed parts were developed using a conveyorized spray processor containing 1% by weight sodium carbonate in water as the developer solution. The developer temperature was maintained at .about.30.degree. C., and the developer solution was sprayed at 10-20 psi. The developed parts were dried by blowing off the excess water, after development, with a forced air stream. The dried parts were then normally fired in air using a 90 minute profile with a peak temperature of 580 C for 10 minutes. Parts were microscopically examined to show that developed lines about 40 microns wide were cleanly patterned. Subsequently, the color of the black layer from the back side of the glass slide were measured using a Minolta CR-300 colorimeter calibrated with multiple standards. The L* index of the single layer black parts was 20.0 and the L* index of the black/DC204 parts was 6.3. When the when the black composition was printed at 6 um dried thickness and processed in the same conditions, the L* index for both the black parts and the black/DC204 parts was 5.1.

Example 45

700 grams of concentrated nitric acid was added to 2 liters of de-ionized water. Then 611.1 grams of bismuth nitrate pentahydrate, 465.4 grams of 51% manganous nitrate solution, and 367.1 grams of cobalt (ii) nitrate hexahydrate were added to the acid solution and were stirred until dissolved. The solution was diluted to 5 liters with additional de-ionized water and labeled Solution A. Solution B was prepared by diluting 500 ml of 35% aqueous hydrogen peroxide with 4.5 liters of de-ionized water. The two solutions were pumped at rate of 180 ml/minute using a 2-channel peristolic pump through two channels of a Y-shaped connector and allowed to mix as it flowed through a 25 cm length of ½ tubing attached to the remaining channel of the Y-connector. The mixture was then allowed to drip into 2.4 kg of 30% sodium hydroxide solution which was actively being stirred. A black precipitate immediately formed. On conclusion of the reaction, the warm solution was allowed to stirred for an additional hour, before being transferred to a filter. The precipitate was filtered to remove most of the filtrate and was then washed with several 1 liter aliquots of de-ionized water which were consecutively removed by further filtering. The washed precipitate was then transferred to stainless steel trays, frozen, and freeze-dried using a commercially available unit. The surface area of the freeze dried powder was about 100 m2/g.

Example 46

Four 100 g samples from the powder of Example 46 were subsequently placed in an alumina crucible and calcined in a box oven at various conditions to achieve lower surface area shown in Table 4 below.

TABLE 4

| Time (hours) | Temperature (C.) | Surface Area $m^2/g$ |
|---|---|---|
| 3 | 470 | 41.1 |
| 3 | 520 | 24.0 |
| 3 | 570 | 15.2 |
| 5 | 600 | 8.3 |

Example 47

Photoimageable pastes with the composition of Example 46 were prepared using the pigments in Example 46. The resulting parts were processed using the same conditions of Example 45. The L* indices of the parts were measured using a calibrated Minolta CR-300 calorimeter. The results are tabulated below in Table 5.

TABLE 5

|  | Pigment Surface Area ($m^2/g$) | | | |
|---|---|---|---|---|
|  | 8.3 | 15.2 | 24.0 | 41.1 |
| Black layer thickness of 4 um dried | | | | |
| L* of Black alone | 4.5 | 4.8 | 9.8 | 24.3 |
| L* of Black + DC204 | 5.0 | 5.7 | 6.9 | 9.7 |
| Black layer thickness of 6 um dried | | | | |
| L* of Black alone | 4.6 | 4.7 | 4.6 | 12.0 |

What is claimed:

1. A composition of the formula $$Bi_{26-x-y}Mn_xCo_yO_{40}$$

wherein the sum of x and y is between 7.8 and 20.8, wherein x is at least 1.3 and y is at least 1.3.

2. The composition of claim 1, wherein the sum of x and y is between 13 and 20.8, and x or y is at least 2.6.

3. The composition of claim 1, wherein the sum of x and y is between 15.6 and 20.8 and x or y is at least 5.

4. The composition of claim 1, wherein the composition further comprises one or more elements selected from the group consisting of: Ni, Cu, Al, Ce, Pb, Ga, Mg, In, V, Li, P, Fe, Ti, Cr, Zn, Ge, Ni, Cd, Si, lanthanide metals and mixtures thereof.

5. The composition of claim 1, wherein the pigment composition is prepared by the precipitation of soluble metal nitrates from an acidic solution under oxidizing conditions using excess base.

6. The composition of claim 1, wherein the pigment is prepared by the reaction of inorganic materials at temperatures ranging from 600° C. to 1000° C.

7. A black pigment comprising the composition of claim 1 wherein the black pigment has an L* value in the range of 4 to 10.

8. A flat panel display comprising a black layer, wherein the black layer comprises the composition of claim 1.

9. A thick film black composition comprising:
(a) black pigment of the formula $$Bi_{26-x-y}Mn_xCo_yO_{40}$$

wherein, the sum of x and y is between 7.8 and 20.8, and x or y is at least 1.3;
(b) one or more glass frits with a softening point in the range of 400° C. to 600° C.;
(c) organic polymer binder; and
(d) organic solvent.

10. The composition of claim 9 further comprising photoinitiator and photocurable monomer.

11. The composition of claim 10 further comprising an electrically conductive powder.

12. A method of forming a black layer of a flat panel display comprising the steps of:
(a) providing a black composition comprising:
(i) a black pigment comprising the composition of claim 1;
(ii) one or more glass frits and
(iii) organic matter;
(b) depositing the black composition on a ceramic substrate; and
(c) firing the black composition on the ceramic substrate.

13. The composition of claim 1 wherein the composition is a pigment composition.

14. The composition of claim 13 wherein the composition is a black pigment composition with an L* value in the range of 4 to 10.

15. The composition of claim 1 wherein x is greater than or equal to 1.3 and wherein y is greater than or equal to 1.3.

16. A flat panel display comprising the composition of claim 1.

17. The composition of claim 1 wherein the composition consists essentially of $$Bi_{26-x-y}Mn_xCo_yO_{40}$$

wherein, the sum of x and y is between 7.8 and 20.8, wherein x or y is at least 1.3 and wherein neither x nor y may be zero.

18. The composition of claim 1, wherein x and y are selected from the group consisting of:
x is 5.20 and y is 2.60;
x is 2.60 and y is 5.20;
x is 3.90 and y is 3.90;
x is 5.20 and y is 5.20;
x is 6.50 and y is 6.50;
x is 9.75 and y is 3.25;
x is 3.25 and y is 9.75;
x is 8.67 and y is 8.67;
x is 13.00 and y is 6.50;
x is 6.50 and y is 13.00;
x is 10.40 and y is 10.40;
x is 18.20 and y is 2.60;
x is 2.60 and y is 18.20;
x is 19.50 and y is 1.30; and
x is 1.30 and y is 19.50.

19. A composition comprising $Bi_{26-x-y}Mn_xCo_yO_{40}$ wherein the sum of x and y is between 7.8 and 20.8, and x or y is at least 1.3, wherein the composition is a black pigment having an L* value in the range of 4 to 10.

* * * * *